United States Patent
Huber et al.

(10) Patent No.: US 11,850,671 B2
(45) Date of Patent: Dec. 26, 2023

(54) METHOD AND DEVICE FOR MEASURING A ROLL MACHINING TOOL

(71) Applicant: REISHAUER AG, Wallisellen (CH)

(72) Inventors: Philipp Huber, Wallisellen (CH);
Roger Kirsch, Karlsbad (DE);
Hartmut Marx, Wallisellen (CH);
Michael Mros, Weingarten (DE);
Michel Müller, Uster (CH)

(73) Assignee: REISHAUER AG, Wallisellen (CH)

( * ) Notice: Subject to any disclaimer, the term of this patent is extended or adjusted under 35 U.S.C. 154(b) by 888 days.

(21) Appl. No.: 16/766,329

(22) PCT Filed: Dec. 6, 2018

(86) PCT No.: PCT/EP2018/083747
§ 371 (c)(1),
(2) Date: May 22, 2020

(87) PCT Pub. No.: WO2019/115332
PCT Pub. Date: Jun. 20, 2019

(65) Prior Publication Data
US 2020/0368835 A1    Nov. 26, 2020

(30) Foreign Application Priority Data

Dec. 15, 2017   (CH) ..................................... 01526/17

(51) Int. Cl.
*B23F 23/12*  (2006.01)
*B23F 5/16*   (2006.01)
(Continued)

(52) U.S. Cl.
CPC .......... *B23F 23/1218* (2013.01); *B23F 5/163* (2013.01); *B23Q 17/00* (2013.01); *G05B 19/406* (2013.01); *G05B 2219/37275* (2013.01)

(58) Field of Classification Search
CPC ...... B23F 23/1218; B23F 5/163; B23Q 17/00; G05B 19/406; G05B 2219/37275
See application file for complete search history.

(56) References Cited

U.S. PATENT DOCUMENTS

| 5,857,894 A | 1/1999 | Griesbach et al. |
| 6,565,418 B1 | 5/2003 | Feisel |

(Continued)

FOREIGN PATENT DOCUMENTS

| DE | 199 27 872 A1 | 10/2000 |
| DE | 10 2007 053 993 A1 | 4/2009 |

(Continued)

OTHER PUBLICATIONS

Priority Document of CH application 01412/16 dated Oct. 21, 2016.

(Continued)

*Primary Examiner* — Michael J Dalbo
*Assistant Examiner* — Kaleria Knox
(74) *Attorney, Agent, or Firm* — Sughrue Mion, PLLC

(57) ABSTRACT

The invention relates to a method for measuring a tool (1) for roll machining toothed workpieces, wherein a virtual contact points is calculator on a rounded virtual blade of a virtual tool. The relative orientation between the tool axis (B) and the measuring device (11) as well as a translational relative position between the tool and the measuring device are then calculated and adjusted on the basis of the calculated virtual contact point. The measurement is taken on the real blade in the adjusted relative orientation and relative position, and the measurement can be taken in particular using a cylindrical scanning means in the form of a laser beam, wherein the cylindrical scanning means tangentially contacts the virtual blade in the virtual contact point.

27 Claims, 11 Drawing Sheets

(51) Int. Cl.
*B23Q 17/00* (2006.01)
*G05B 19/406* (2006.01)

(56) References Cited

U.S. PATENT DOCUMENTS

| | | | |
|---|---|---|---|
| 8,411,283 B2 | 4/2013 | Maschirow et al. | |
| 2012/0129434 A1 | 5/2012 | Hackman et al. | |
| 2015/0063927 A1* | 3/2015 | Sjoo | B23F 5/163 407/115 |
| 2015/0081083 A1 | 3/2015 | Kreschel et al. | |
| 2019/0076944 A1 | 3/2019 | Wurfel | |

FOREIGN PATENT DOCUMENTS

| | | | | |
|---|---|---|---|---|
| DE | 10 2010 054 742 A1 | | 6/2012 | |
| DE | 102010054742 A1 * | | 6/2012 | ......... B23Q 17/2457 |
| DE | 102012011956 B3 * | | 12/2013 | ............ B23F 21/046 |
| EP | 1 050 368 A1 | | 11/2000 | |
| EP | 1 398 598 A1 | | 3/2004 | |
| EP | 2570217 A1 * | | 3/2013 | ............. B23F 5/163 |
| EP | 3 453 486 A1 | | 3/2019 | |
| WO | 2016/150985 A1 | | 9/2016 | |
| WO | WO-2016150985 A1 * | | 9/2016 | ............. B23F 23/10 |

OTHER PUBLICATIONS

S. E. Ped, et al., "Development of a Model Series of Hardware-Software Complexes for Automated Measurements of the Parameters of Gear-Cutting Tools", Measurement Techniques, XP35367433A), Mar. 29, 2014, pp. 1370-1376, vol. 56, No. 12.
Andreas Huhsam, "Modelling and experimental investigations of the hob peeling process", Research Report vol. 111, wbk Institute of the University of Karlsruhe, Shaker Verlag GmbH, 2002, pp. 23-66.
Andreas Bechle, "A contribution to reliable machining using the high performance production process of hob peeling", Research Report vol. 132, wbk Institute of the University of Karlsruhe, Shaker Verlag GmbH, 2006, pp. 26-68.
International Search Report for PCT/EP2018/083747 dated Feb. 26, 2019 (PCT/ISA/210).

* cited by examiner

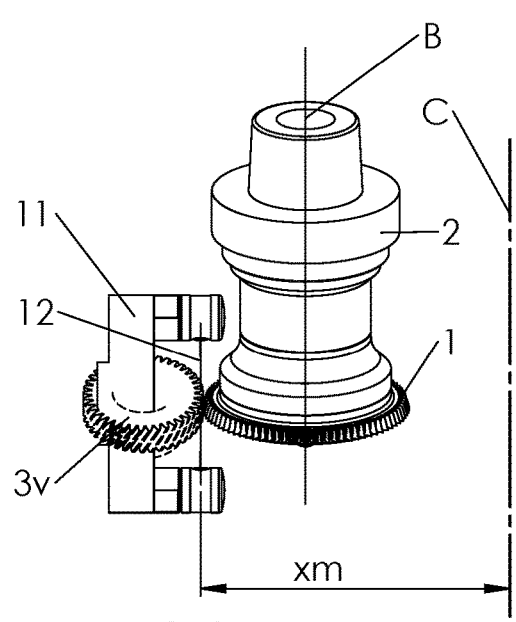
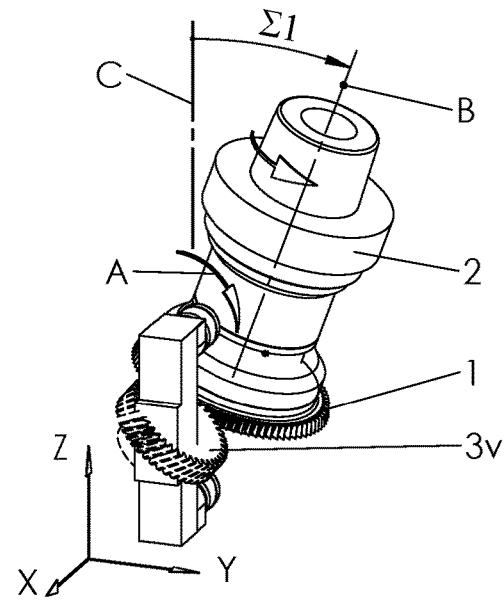
FIG. 9
FIG. 9a
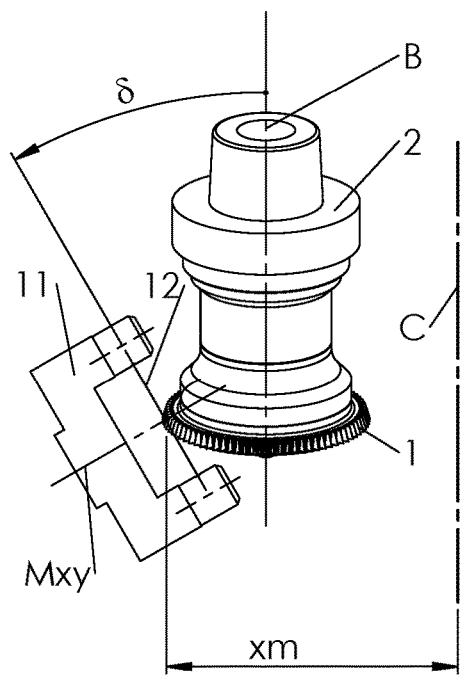
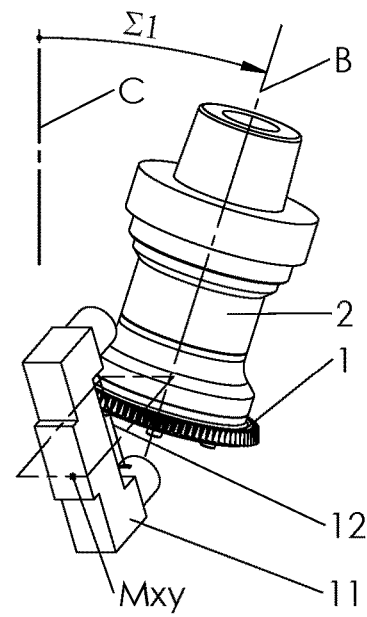
FIG. 10
FIG. 10a

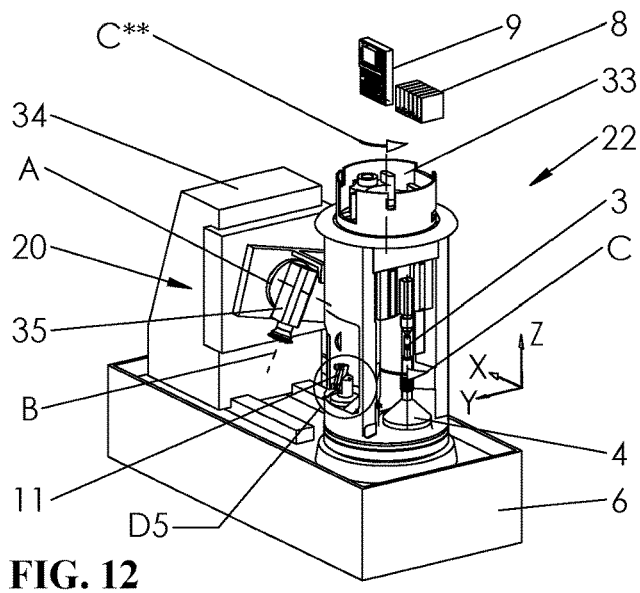
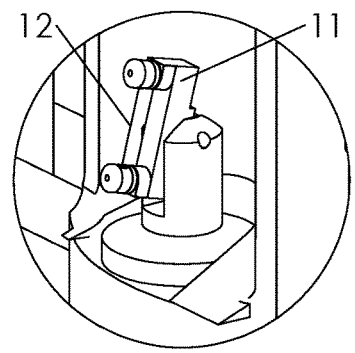
FIG. 12
FIG. 12a
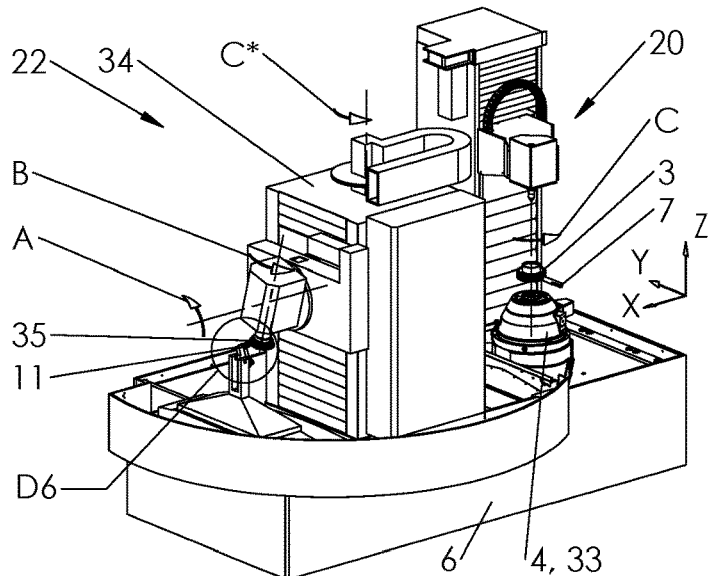
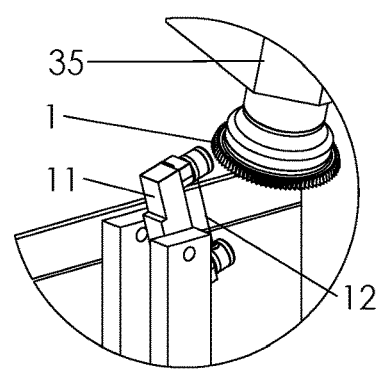
FIG. 13
FIG. 13a

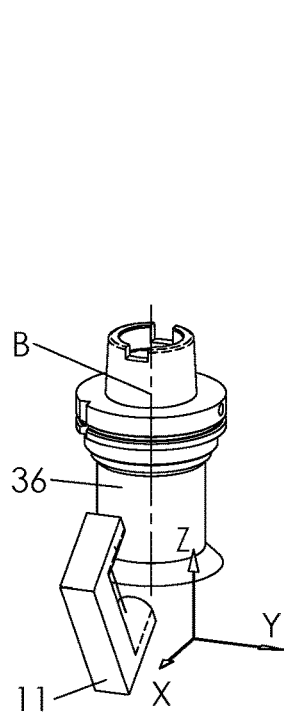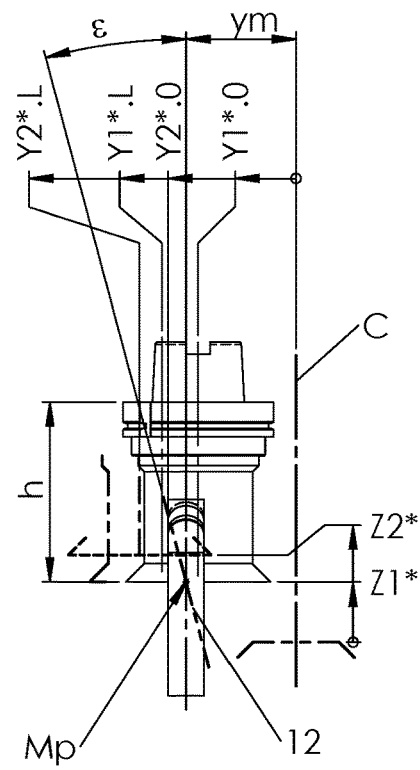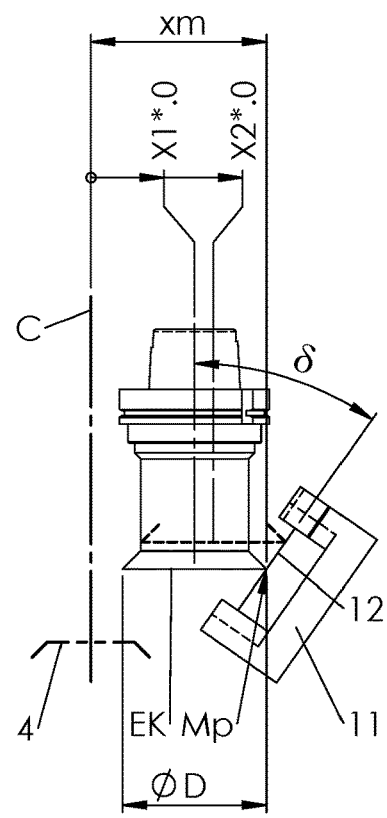
FIG. 14    FIG. 14a    FIG. 14b
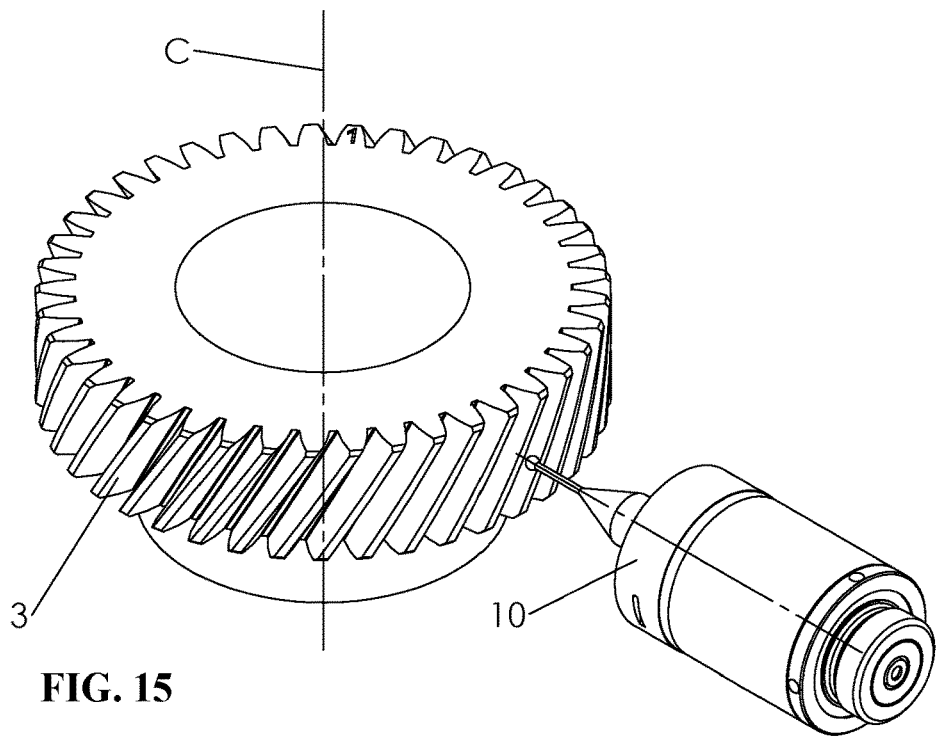
FIG. 15

METHOD AND DEVICE FOR MEASURING A ROLL MACHINING TOOL

CROSS REFERENCE TO RELATED APPLICATIONS

This application is a National Stage of International Application No. PCT/EP2018/083747 filed Dec. 6, 2018, claiming priority based on Swiss Patent Application No. 01526/17 filed Dec. 15, 2017.

TECHNICAL FIELD

The present invention relates to a method for measuring a generating machining tool and to a device for carrying out the method.

PRIOR ART

Hob peeling (generating skiving) is a continuous machining method wherein gear-like tools are used for machining rotating workpieces. Hob peeling can be used not only for green machining, but in particular also for the hard-fine machining of pre-machined workpieces. For machining a workpiece, tool and workpiece are received on rotating spindles. The rotational axes of tool and workpiece are arranged in a skew manner. As a result of coupling the rotational movements of tool and workpiece about the rotational axes, a rolling movement with complicated hob peeling kinematics is realized, as it is typical for this method. Both exterior and interior gears can be machined with said machining process.

The teeth of a hob peeling tool form cutting edges in the region of the end face of the tool. In practice, the cutting edge of each tooth does not form a perfectly sharp edge but rather is rounded with a radius. The final tooth flank on the peeled workpiece is formed by the geometrically defined cutting edge of the hob peeling tool in an enveloping cut, wherein at the end of the hob peeling process practically no more chips are removed and contact between tool and workpiece is effected only in a pointwise manner. In the course of the rolling movement, the corresponding contact point between the finished workpiece and the tool moves continuously along the rounded cutting edge. The skew arrangement of the rotational axes of tool and workpiece results in the contact point not only moving along the cutting edge in the longitudinal direction, but at the same time its position on the curved portion of the rounded cutting edge of the tooth also changing transversely thereto. The contact points acting in the course of the rolling movement therefore form a space curve (a curve in three-dimensional space) on the rounded cutting edge of the tooth. The course of said space curve is determined by the design of the tool and machine settings such as the relative orientation and position of tool and workpiece. The space curve can be calculated from the design data.

The dissertations by Andreas Hasam, "Modellbildung and experimentelle Untersuchungen des Wälzschälprozesses" ("Modelling and experimental investigations of the hob peeling process"), Research Report Volume 111, wbk Institute of the University of Karlsruhe, Shaker Verlag GmbH, 2002, Pages 23-66 and Andreas Bechle, "Beitrag zur prozesssicheren Bearbeitung beim Hochleistungsfertigungsverfahren Wälzschälen" ("A contribution to reliable machining using the high performance production process of hob peeling"), Research Report Volume 132, wbk Institute of the University of Karlsruhe, Shaker Verlag GmbH; 2006, Pages 26-68, discuss comprehensively the modelling of hob peeling and the production of a hob peeling tool meeting quality requirements as a decisive element of the hob peeling process. Hühsam presents a kinematic model of hob peeling. The complex cutting edge geometry of a hob peeling tool can be calculated with this approach. The schematic operation for producing said hob peeling tool is shown by Bechle in FIGS. 2-21 on page 28. The tool blank is completed by means of grinding. After the first grinding cycle, the hob peeling tool is gauged on a measuring machine, and the dimensional and geometric accuracy is determined. Deviations from the desired geometry are determined and eliminated by correcting the NC dressing process and renewed profiling of the grinding disk. Said cycle is repeated as often as required until dimension and geometry are correct.

Where measuring is carried out using a conventional measuring machine, the fact that the contact points on the rounded cutting edge move along the already mentioned space curve in the course of the rolling movement is not taken into consideration. A conventional measuring machine is not capable of taking said space curve into consideration.

In addition, measurement on a separate measuring machine is disadvantageous because re-clamping the tool between measuring machine and tool spindle is time-consuming and it is possible for clamping and re-clamping errors to be made which have a negative influence on the production result.

US 2015/0081083 A1 proposes gauging a hob peeling tool in a contacting manner. A measuring body, which provides a precise copy of the flanks of a workpiece toothing to be machined, is provided to this end. While said type of measuring enables precise determination of the distance between workpiece and workpiece axis to be set up on the machine tool, it is not suitable for gauging the cutting edge which acts during hob peeling.

WO 2016/150985 A1 proposes measuring the deviation of the position of the tip cutting edge, of the left cutting edge and of the right cutting edge of each cutting tooth of a hob peeling tool from an ideal contour in order to determine concentricity deviations in this way. The measurement is effected in a contacting manner using a measuring ball. While in the case of said method, the position of the cutting edge is determined, the actual cutting edge itself is not gauged. The determined positional deviations are then used during the machining of the workpiece to reduce the effects of the concentricity error on the workpiece geometry by providing periodic non-linearity of the coupling ratio between workpiece rotation and tool rotation or periodic modification of the distance between axes.

Methods for the optical measurement of measuring objects, which operate using a light transmission method, are known in the prior art, wherein the measuring object is moved between a light source and a light detector and the light detector detects when the measuring object interrupts the light beam of the light source.

Such a method is disclosed, for example, in DE 199 27 872 A1. In order to be able to also detect regions which, on account of the geometry of the measuring object, would otherwise be difficult to detect, it is proposed that the light source and the light detector form a unit and are mounted on a pivoting device. The pivoting device is pivotable about an axis which cuts the rotational axis of the object to be measured. The pivoting device is additionally adjustable in a translational manner along a second axis which extends perpendicularly to the pivot axis. The object to be measured is adjustable along a third axis which is parallel to the first axis and is rotatable about a fourth axis which extends parallel to the second axis and is cut by the first axis. As a result, it is possible to measure, for example, behind the cutting edge in the case of cutting teeth of a rotationally symmetrical tool. The document does not suggest using such an arrangement for gauging hob peeling tools, in particular with a rounded cutting edge.

EP 1 050 368 A1 proposes an optical measuring device for positioning devices. A light source and a light detector are arranged on a common holder and are oriented such that a measuring light beam from the light source falls on the light detector. The light detector detects when the beam is interrupted by an object to be measured. When an interruption occurs, a corresponding signal is generated, There is therefore a simple binary evaluation with the statuses "light received" ("L") and "no light received" ("0"). The light beam can be uncollimated, i.e. it can diverge slightly from the light source toward the light detector. A narrow light channel, through which the light has to pass in order to get to the light detector, is arranged in front of the light detector. As a result, the detector effectively "sees" only a cylindrical beam region of the light beam bundle emitted by the light source. The light beam acts, therefore, as a cylindrical sensing surface by way of which the measuring object is gauged. The use for the measuring of hob peeling tools is not disclosed.

A corresponding laser measuring bridge is provided, for example under the designation NC4 produced by Renishaw, Wotton-under-Edge, UK.

U.S. Pat. No. 8,411,283 B1 discloses a method wherein a gear is gauged by means of distance measurements. EP 1 398 598 A1 proposes gauging a small cutting-edge geometry by means of line lasers and image capturing.

SUMMARY OF THE INVENTION

In a first aspect, it is an object of the present invention to provide a measuring method for measuring the cutting edge of a hob peeling tool which enables measurement with particularly high levels of precision, is automatable and can be realized in a cost-efficient, simple and quick manner.

A method is thus provided for measuring a tool for the generating machining of toothed workpieces. The tool is rotatable about a tool axis and comprises a plurality of cutting teeth. Each of the cutting teeth forms at least one real cutting edge. The method is carried out using a measuring device. The method comprises the following steps, said steps not necessarily being carried out in the sequence provided:
  (a) calculating a virtual contact point on a virtual cutting edge of a virtual tool, wherein the virtual cutting edge extends along a cutting edge longitudinal direction and comprises a rounding transversely to the cutting edge longitudinal direction;
  (b) calculating a relative orientation between the tool axis and the measuring device as well as a translational relative position between the tool and the measuring device on the basis of the calculated virtual contact point;
  (c) setting the calculated relative orientation between the tool axis and the measuring device and the calculated relative position between the tool and the measuring device; and
  (d) carrying out a measurement on the real cutting edge in the set relative orientation and relative position,
the preceding steps (a) to (d) being carried out for a plurality of virtual contact points along the virtual cutting edge.

In this method, a virtual tool, which defines a virtual cutting edge, is considered first of all. As can be seen in the following description, the virtual cutting edge serves for the purpose of calculating how the tool axis should be aligned relative to the measuring device and how the tool should be positioned relative to the measuring device so that the measuring can be effected with a high level of precision. The virtual cutting edge corresponds to a predefined cutting edge geometry, in particular the desired cutting edge geometry according to the tool design. Said virtual cutting edge does not form a perfectly sharp edge along the cutting edge longitudinal direction but rather is rounded in a defined manner between the cutting surface or, if present, the cutting surface chamfer, and the clearance surface or, if present, clearance surface chamfer. The virtual cutting edge consequently forms a complex, curved surface.

A space curve runs on said virtual cutting edge, the space curve consisting of the points at which the complex curved surface would contact a virtual workpiece having a predefined desired flank geometry when the virtual tool carries out the rolling movement with the virtual workpiece, the rolling movement being the same as in the case of real machining of a real workpiece with the real tool. Said points on the virtual cutting edge are designated as virtual contact points. The curve consisting of the virtual contact points normally does not extend in a transverse cross sectional plane of the tool. The points in space, relative to the axis of the virtual workpiece and to the axis of the virtual tool, at which said contact takes place over all rolling positions, also form a curve, which is called a virtual engagement line. The point on the virtual engagement line that is associated with a virtual contact point is designated as a virtual engagement point. The virtual contact point on the cutting edge and the associated virtual engagement point in space are identical for the case that the rolling position is assumed, in which the virtual contact point touches the final contour of the desired flank of the workpiece. On the virtual workpiece, which corresponds to the desired geometry, there is also a virtual contact point which also coincides with the virtual engagement point in the rolling position of contact.

For a selected virtual contact point it is now determined how the tool axis and the measuring device have to be oriented relative to one another, and how the tool and the measuring device have to be set relative to one another with regard to their translational positions, so that a measurement can be carried out at the virtual contact point (and not, for instance, at another position on the curved portion of the cutting edge). In particular, for a hob peeling tool, the orientation and translational position calculated in this manner will normally change from virtual contact point to virtual contact point along the virtual cutting edge on account of the skew arrangement between the virtual tool and virtual workpiece.

The real tool and the measuring device are now set relatively to one another in the manner that has been calculated beforehand. CNC axes of the machine are preferably used for said setting. In the thus set orientation of the workpiece axis relative to the measuring device and the thus set position of the tool relative to the measuring device, a measurement is then performed on the real cutting edge of the real tool. If the cutting edge geometry of the real tool differs from that of the virtual tool at the calculated virtual contact point, the measurement quantifies the deviation at the virtual contact point. In particular, further relative movement of the tool relative to the measuring device can be carried out for performing the measurement; for example, to perform the measurement, the real tool can be rotated about the tool axis and the deviation can be expressed as a difference in rotational angle about which the real tool has to be rotated so that the real cutting edge and the virtual cutting edge coincide at the virtual contact point.

The above steps can then be repeated for one or multiple further virtual contact points along the virtual cutting edge, in this way the cutting edge is measured at multiple points along its longitudinal direction. In particular, the above-named steps (a) to (d) can be carried out for at least five virtual contact points along the virtual cutting edge in order to enable a sufficiently detailed assertion concerning the real cutting edge geometry.

In order to interpolate between the measured values for virtual contact points on the cutting edge, a compensating curve for the description of the real cutting edge can be calculated from measurement results which have been determined for various contact points on the same cutting edge by means of equalization calculus in a manner known per se.

In order to set the relative orientation between the tool axis and the measuring device, it is conceivable to modify in each case the orientation and position of the measuring device in space, whilst the orientation of the tool axis and the position of the tool is fixed. As an alternative to this, it is conceivable to modify the orientation of the tool axis and the position of the tool in space, whilst the measuring device is fixed, Mixed forms are also possible. However, often the necessary CNC axes for modifying the orientation of the tool axis in space and for setting the position of the tool in space are already present anyway on a machine tool. It is consequently advantageous if the measuring device is arranged in a spatially fixed manner when carrying out the method and the setting of the relative orientation and of the relative position for each virtual contact point is effected by modifying the orientation of the tool axis in space and the position of the tool in space.

The proposed method can be used in a variety of measuring methods. However, it is suitable, in particular, for a measuring method where the cutting edge of the tool is sensed in a tangential manner. To this end, the measuring device can provide a sensing means which operates in a contactless or contacting manner, and the relative orientation and the relative position are calculated and set in such a manner that the sensing means contacts the virtual cutting edge at the calculated contact point in a tangential manner. The sensing means, in this case, can be a corporeal sensing means which acts in a contacting manner (i.e., a real, permanently existing body), e.g. a sensing finger, or it can be a non-corporeal sensing means which acts in a contactless manner, e.g. in the form of a light beam.

Further advantages are obtained if the sensing means is cylindrical in form and, as a result, defines a cylindrical sensing surface, because in this case the position of the tool along the cylinder axis of the sensing means is irrelevant. This simplifies the setting of the position of the tool and of the measuring device relative to one another and simplifies the measuring operation.

When the sensing means is cylindrical in form, it defines a cylinder axis, and the cylindrical sensing surface extends at a distance from the cylinder axis corresponding to the cylinder radius. In an advantageous design, the relative orientation and the relative position are calculated and set in such a manner that the cylinder axis of the cylindrical sensing means extends parallel to the tangential plane on the virtual cutting edge at the calculated virtual contact point, at a distance from said tangential plane which corresponds to the cylinder radius. Consequently, the cylindrical sensing surface includes the virtual contact point and abuts there tangentially against the virtual cutting edge.

When using a cylindrical sensing means in the aforenamed manner, the cylinder axis extends in a plane which is parallel to the tangential plane on the virtual cutting edge at the calculated virtual contact point. In this case, one degree of freedom still remains for the alignment of the cylinder axis inside said plane. Said alignment can be chosen in an advantageous manner such that the cylinder axis runs substantially along the flank direction (helix angle) of the virtual workpiece. Said alignment of the cylindrical sensing means reduces the risk of collisions with other tool regions in the case of a corporeal sensing means. In the case of a sensing means in the form of a light beam, said alignment reduces the risk of the light beam being shaded by other tool regions.

If the sensing means is formed by a light beam, the method can be carried out in a simple manner as follows: for carrying out the measurement, the tool is rotated about the tool axis in step (d) in the respectively set relative orientation of the tool axis and with the respectively set relative position between tool and measuring device, and the actual angle of rotation at which the light beam is interrupted by the cutting edge is detected during the rotation. As a result, signals "L" (light beam not interrupted, detector bright) and "0" (light beam interrupted, detector dark) are generated in an alternating manner. A deviation between the detected actual rotational angle and a desired rotational angle calculated for the virtual cutting edge can be determined on this basis. Said deviation is a direct measurement for the deviation of the actual cutting edge geometry from the desired cutting edge geometry. An advantage of the proposed method is that said deviation is not determined at any predefined or random position on the curved portion of the cutting edge, but precisely at the point at which workpiece and tool would finally touch if the tool had the predefined desired geometry. The measurement is effected therefore precisely at the point that actually matters during machining and at which the cutting edge should consequently be measured in a particularly precise manner.

The measurement in step (d) can be carried out for multiple or all cutting teeth of the tool in the respectively set relative orientation and relative position so that multiple or all cutting teeth one after another interrupt the light beam and unblock it again. Multiple cutting teeth can be measured quickly and efficiently at the relevant virtual contact points in this way without the relative orientation between tool axis and measuring device and their relative position having to be modified between said measurements.

At least one of the following parameters can be determined from measurements at multiple or all cutting teeth:
concentricity of the tool;
cutting tooth center;
tooth gap center.

One of the following variables can be determined from measurements at one, multiple or all cutting teeth:
at least one measure e.g. profile form error, pitch error) for the deviation of the profile of a flank produced with the real cutting edge from a virtual flank produced with the virtual cutting edge (in particular with the desired cutting edge);
at least one measure for the modification of the cutting edge during machining, for example as a result of wear.

The method can additionally include at least the following steps:
(e) determining at least one setting for a machine controller on the basis of a result of the measurements, the setting causing a relative position between the tool and a workpiece to be set for machining the workpiece; and (f) transmitting the setting to the machine controller.

In other words, the setting of the tool relative to the workpiece can be modified on the basis of the determined cutting edge geometry, e.g. in order to compensate for wear on the cutting edge.

The setting determined in step (e) can also be transmitted to an external computer system which stores the settings at multiple time points and processes them for re-sharpening the tool. The transmission, in this case, can be effected via standard interfaces.

The method can additionally include visualizing a result of the measurement on a screen, in particular on a screen of a control panel of a CNC machine controller.

The tool can be, in particular, a hob peeling (generation skiving) tool or a gear shaping tool.

In particular, in the case of a hob peeling tool, the method proposed here has particular advantages because, as a result of the skew arrangement of the rotational axes of tool and workpiece and the essentially non-involute, complex cutting edge geometry, characteristics are produced which are normally not taken into consideration sufficiently with conventional measuring methods.

In particular, the tool can be a hob peeling tool as described in Swiss patent application CH 01412/16 dated 21 Oct. 2016. The disclosure of said patent application is incorporated herein by reference in its entirety.

The method can be carried out whilst the tool is arranged on a tool spindle, by way of which the machining of workpieces is also carried out. In other words, the method can be carried out directly on the machine by way of which the workpiece machining is also carried out. It is, therefore, not necessary to re-clamp the tool first of all onto the spindle of a separate measuring machine. However, it is also conceivable to carry out the method on a separate measuring machine.

Method steps for calibrating the measuring position in the machine can be carried out additionally prior to carrying out the actual measuring process. Such calibration steps can be repeated where required during a machining cycle.

A device for carrying out such a method can comprise:
a tool spindle for driving the tool for a rotation about the tool axis;
the already mentioned measuring device;
at least one driven pivot axis in order to modify the relative orientation between the tool axis and the measuring device; and
at least one driven linear axis in order to modify the translational relative position between the tool and the measuring device.

The device then additionally comprises a controller which is configured for carrying out the method shown above. The considerations specified above regarding the method also apply equally to the device according to the invention. The controller can comprise, in particular, software which when executed by a processor causes the controller to carry out the method discussed above.

The device can comprise more than one pivot axis in order to be able to set freely the orientation of the tool axis in space relative to the measuring device. In said case, the pivot axes are preferably not parallel to one another and preferably extend orthogonally to one another. The device can also comprise, correspondingly, more than one linear axis in order to modify freely the translational relative position between the tool and the measuring device. The directions of the two or three linear axes are then preferably in a mathematical sense linearly independent and preferably also orthogonal to one another.

In particular, the arrangement of the pivot and linear axes can be realized according to the following rules:
the measuring device is arranged in a stationary manner on the machine bed, and the alignment and positioning of the tool in space are effected by means of at least one linear axis and by means of at least one pivot axis or
the measuring device is arranged fixedly on a displaceable slide which is displaceable at least along a linear axis, and the alignment and positioning of the tool in space are effected by means of at least one pivot axis.

In both realization variants, further pivot and/or linear axes can be provided for the tool and/or for the measuring device.

In particular, on the tool carrier of a known gear manufacturing machine according to a machine concept as in U.S. Pat. No. 6,565,418 B1 or U.S. Pat. No. 5,857,894, a hob peeling head can be arranged instead of a grinding head. The measuring device can be arranged in said machines as follows:

(i) In the case of the machine concept of the gear manufacturing machine according to U.S. Pat. No. 6,565,418 B1, a hob peeling tool is arranged on a tool carrier which is displaceable in relation to the machine bed. The machine bed additionally carries a movable, in particular displaceable, workpiece carrier. The measuring device can then be arranged on said workpiece carrier and be movable by means of said movable workpiece carrier from a park position into a measuring position. In the case of said machine concept, the movable tool carrier with hob peeling head realizes three linear axes X, Y and Z as well as a pivot axis A and a rotational axis B. In addition, there is present a further linear or pivot axis C* which moves the workpiece carrier with the measuring device from a park position into a measuring position and back. The movable workpiece carrier can serve for further purposes. In particular, at least one workpiece spindle can also be arranged on the movable carrier for clamping a workpiece to be machined.

(ii) in the case of the machine concept according to U.S. Pat. No. 5,857,894, the hob peeling tool is arranged on a tool carrier which is displaceable and pivotable in relation to the machine bed. The machine bed additionally carries a stationary workpiece carrier with workpiece spindle. The measuring device can then be arranged in a stationary manner on said machine bed. In the case of said machine concept, the movable tool carrier with hob peeling head also realizes three linear axes X, Y and Z as well as a pivot axis A and a rotational axis B. In addition, there is also present here a further linear or pivot axis C*; however, this serves for the purpose of pivoting the tool carrier (and not, as in the case of the machine concept described above, the workpiece carrier) The tool carrier, in this case, is movable, in particular pivotable, in a preferred manner between an operating position, in which a tool mounted on the tool spindle is movable into engagement with a workpiece, and a measuring position in which the tool interacts with the measuring device.

As has already been explained, the measuring device can provide a sensing means which operates in a contactless or contacting manner, and the controller can calculate and set the relative orientation and the relative coordinates in such a manner that the sensing means contacts the virtual cutting edge at the calculated virtual contact point in a tangential manner. In this case, it is advantageous, as mentioned, if the sensing means is cylindrical in form.

The measuring device can form, in particular, a light barrier. To this end, the measuring device can comprise a light source and a light detector, the light source being configured for generating a light beam which is directed onto the light detector. The sensing means, in this case, acts in a contactless manner and is formed by at least one region of the light beam. Preferably the light source and the light detector are configured in such a manner that a cylindrical beam region of the light beam acts effectively as sensing means. The controller interacts in such a manner with the tool spindle that the tool spindle rotates the tool about the tool axis for carrying out the measurement in the set relative orientation of the tool axis and with the set relative coordinates. The light detector is then configured for detecting, during the rotation, the actual angle of rotation at which the light beam is interrupted by the cutting edge. The light source can include, in particular, a laser so that the measuring device forms a laser bridge. The laser can generate, in particular, a beam in a cylindrical form.

BRIEF DESCRIPTION OF THE DRAWINGS

Preferred embodiments of the invention are described below by way of the drawings, which serve only for explanation and are not to be interpreted in a limiting manner. In the drawings:

FIG. 9 shows a side view of an arrangement with a vertically oriented laser bridge and tool spindle;

FIG. 9a shows a perspective view according to FIG. 9 with rotational and linear axes for measuring;

FIG. 10 shows a side view of an arrangement with laser bridge and tool spindle arranged in a tilted manner;

FIG. 10a shows a perspective view according to FIG. 10;

FIG. 12 shows a perspective view of a gear manufacturing machine for hob peeling with a hob peeling head on a displaceable tool carrier and with two workpiece spindles on a pivotable workpiece carrier, the workpiece carrier carrying the measuring device;

FIG. 12a shows an enlarged view of a detail of 12 in the region D5;

FIG. 13 shows a perspective view of a gear manufacturing machine with a workpiece spindle for hob peeling with a hob peeling head on a displaceable and pivotable tool carrier, a measuring device being arranged fixedly on a machine bed;

FIG. 13a shows an enlarged view of a detail of FIG. 13 in the region D6;

FIG. 14 shows a perspective view for calibration with a calibration mandrel and a laser bridge arranged in a tilted manner;

FIG. 14a shows a front view of FIG. 14 with axial orientations in the Y direction;

FIG. 14b shows a side view of FIG. 14 with axial orientations in the X direction; and FIG. 15 shows a perspective view of an arrangement for post process measuring of the workpiece with a scanning, tactile sensing device.

DESCRIPTION OF PREFERRED EMBODIMENTS

Figure 1:
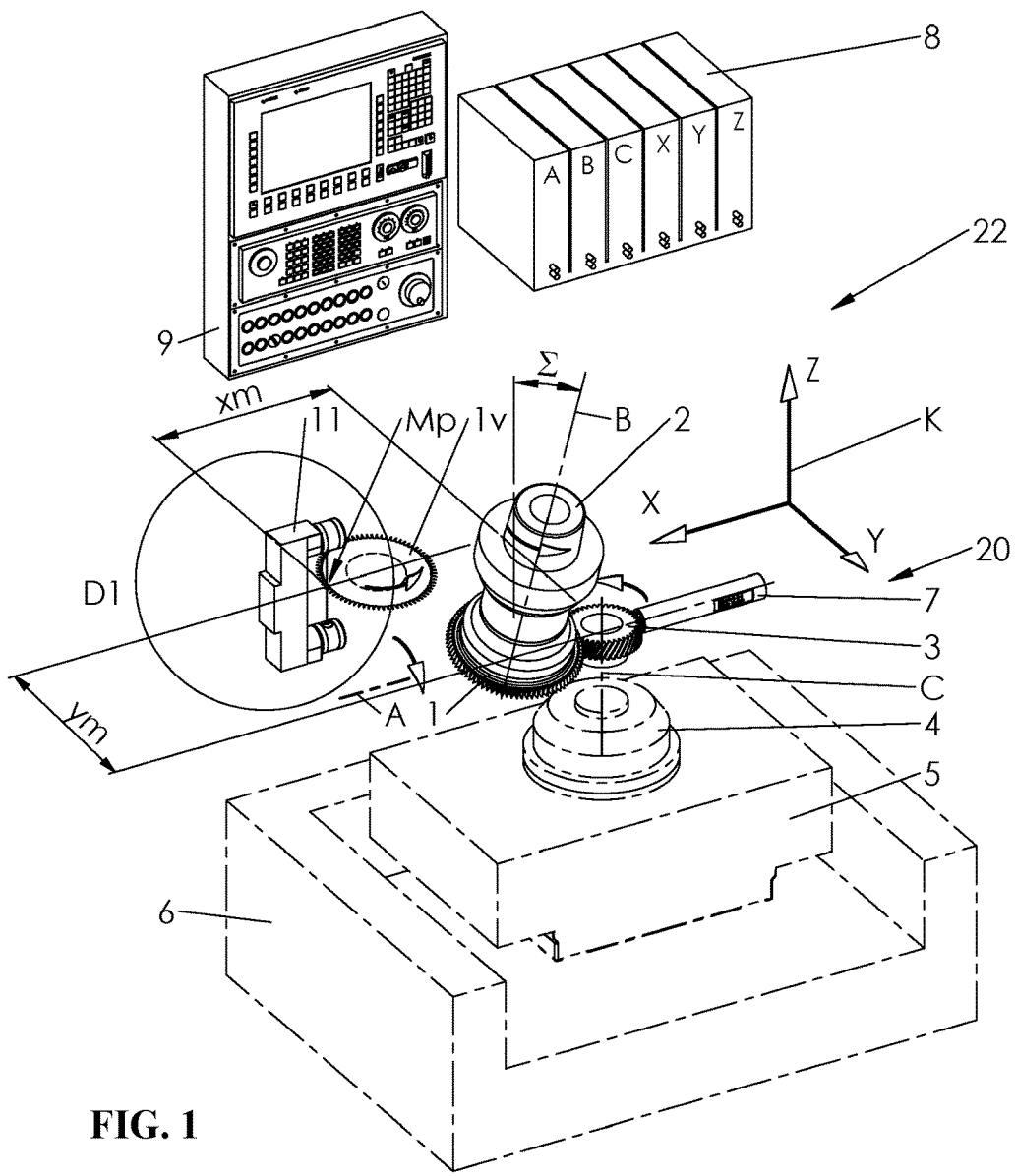
FIG. 1 shows a perspective view of a workpiece and tool assignment with hob peeling tool and measuring device and further modules of a hob peeling machine.

The terms and toothing geometries applicable to cylindrical gears are fixed in standard DIN ISO 21771:2014-08 and are understood in this document in accordance with said standard.

The drawings illustrate, in schematic and enlarged representations, embodiments of the method according to the invention. The same reference symbols are used in all Figures for identical or similar surfaces, axes, angles or further elements: Virtual objects and virtual tools, virtual workpieces etc, are designated with the letter "v" which is appended to the reference symbol for the corresponding real object. The descriptions regarding the Figures generally relate to hob peeling of external gears. Analogous observations apply to the hob peeling of internal teeth.

Exemplary embodiments of the method according to the invention are explained below in particular by way of a real hob peeling tool 1 and a virtual hob peeling tool 1v. The hob peeling tool 1 or 1v is gear-shaped and comprises a plurality of cutting teeth 14 (see, for example, FIG. 2) which each form a rounded cutting edge in the region of the end face of the tool. It is pointed out that said tool is shown in a highly simplified manner in the drawings. The considerations below can be applied to any other hob peeling tools, including such with step cuts or other geometric designs.

FIG. 1 shows as an example a perspective view of selected elements of a modern CNC hob peeling machine 22. A rectangular system of coordinates K, which defines the directions X, Y and Z, is used for describing directions in the hob peeling machine. The origin of the system of coordinates is located in the workpiece center or the workpiece axis C. A CNC controller 8 serves for the purpose of actuating the machine axes A, B, C, X, Y and Z. A control panel 9 forms the interface for the operating personnel of the CNC controller 8.

The machine defines a working space 20. It comprises a machine bed 6. In the present example, a workpiece spindle 4 is arranged on a CNC-controlled slide 5 displaceable in the Y direction. A workpiece 3 is clamped on the workpiece spindle 4 by a clamping means which is not shown in the drawing. The workpiece spindle 4 is rotatable about a workpiece axis C, the workpiece axis extending vertically in the present example. A meshing probe 7 serves for the purpose of determining, in a contactless manner, the angular position of the tooth gaps of the workpiece 3 about the workpiece axis C in order to mesh the workpiece 3 with the hob peeling tool 1 without collision.

The hob peeling tool 1 is mounted on a workpiece spindle 2 and is rotatable about a tool axis B. The tool axis B can be pivoted about the axis A by a tool setting angle Σ in relation to the vertical, the pivot axis A in the present example extending parallel to the X axis. To this end, the machine 22 can comprise in a known manner a tool carrier, which is not shown in the drawings, with a pivot body fastened pivotably thereto, to which, in turn, the tool spindle 2 is fastened. The tool spindle 2 is displaceable by means of slides, not shown, (also designated below as machine axes) along the directions X and Z in relation to the machine bed 6. IL as an alternative to this, the CNC hob peeling machine 22 is provided with a stationary workpiece spindle 4, the tool spindle 2 is then also displaceable in the Y direction.

The machine 22 additionally comprises a laser bridge 11. The laser bridge includes a light source in the form of a laser which generates a vertically extending (in Z direction) laser beam, and a light detector which detects an interruption of the laser beam by an object. The laser beam extends at a distance to the workpiece axis C, the laser beam being spaced from the workpiece axis C by an amount xm along the X axis and an amount ym along the Y axis. In the present example, the laser bridge 11 is arranged fixedly on the displaceable slide 5 on the machine bed 6. All movements necessary for the measurement are carried out by the rotational and translational machine axes A, B, X, Y and Z. In particular, starting from the axis position for machining the workpiece 3, the tool spindle 2 is moved along the translational axes X and Z and is brought into a suitable orientation by pivoting it about the pivot axis A into an angular position Σ1. The spaced laser bridge 11 is then moved into an axis position for measuring the hob peeling tool. 1 by displacing the Y carriage 5. If the laser bridge 11 is arranged, as an alternative to this, in a stationary manner on the machine bed 6, all translational axes X, Y and Z are then assigned to the tool spindle 2.

In a very simplified realization of said fixed arrangement of the laser bridge 11, just one linear axis could be used for the linear positioning of the tool 1. In this case, the X axis would displace the tool 1 away from the workpiece 3 into the axis position for measuring.

The Z axis would not be absolutely necessary if a laser bridge 11 were to be used with a cylindrical laser beam 12 but would give rise to accuracy disadvantages if it were not there. Dispensing with the Y axis, in contrast, would restrict the below-described measuring method described in part.

The relative positioning and alignment of measuring bridge 11 and tool 1 can also be realized in a manner other than as described above.

In addition, a virtual tool 1v with the measuring position Nip is shown in FIG. 1. The significance of the virtual tool 1v is explained in more detail below in conjunction with FIG. 1a.

Figure 1A:
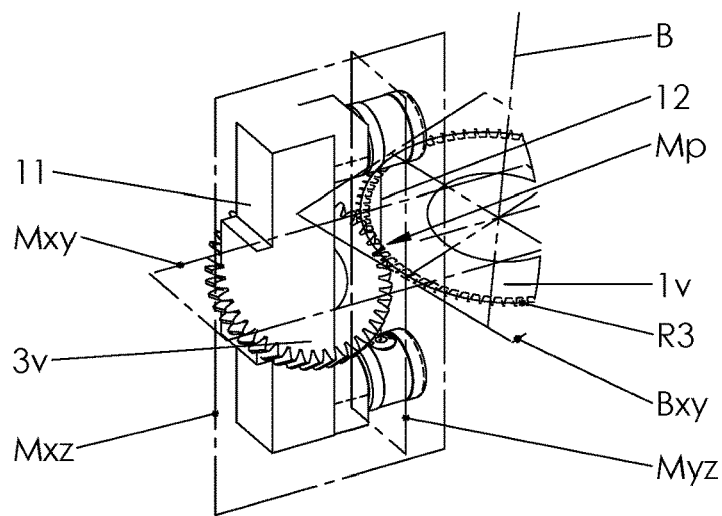
FIG. 1a shows an enlarged view of a detail of FIG. 1 in the region D1.

FIG. 1a shows an enlarged view of a detail of the laser bridge 11 in the region D1 with the virtual tool 1v arranged in a skew manner and with a virtual workpiece 3v which is in rolling engagement with the virtual hob peeling tool 1v. Also shown in FIG. 1a are multiple reference planes Mxy, Mxz, Mvz and Bxy. In this case, the reference planes Mxy, Mxz, Myz define the position and orientation of the laser bridge 11. In particular, in the present example the reference plane Mxz includes the laser beam 12 and extends through the housing of the laser bridge. The reference plane Myz also includes the laser beam 12 and extends orthogonally to the reference plane Mxy. The reference plane Mxy extends horizontally and orthogonally to the two vertical reference planes Mxz and Myz. It defines the center of the laser bridge. The measuring position Mp is situated at the common point of intersection of the planes Mxy, Mxz, Myz. The reference plane Bxy extends orthogonally to the tool axis B and represents a transverse cross sectional plane of the virtual tool 1v, said transverse cross sectional plane extending through the cutting edges of the virtual tool 1v.

The virtual tool 1v and the virtual workpiece 3v are in rolling (generating) engagement with one another. The virtual workpiece 3v has a predefined desired flank geometry. The virtual tool 1v comprises a plurality of virtual cutting teeth, as shown as an example in FIGS. 2, 3, 5 and 6. Each cutting tooth defines a rounded virtual cutting edge. Said virtual cutting edge is configured in such a manner that it generates precisely the predefined desired flank geometry of the workpiece 3v by the rolling movement of the tool 1v with the workpiece 3v. The virtual tool 1v and the virtual workpiece 3v contact one another on any predefined flank at any point in time of the rolling movement at most at one single virtual contact point. In the course of the rolling movement, the contact moves from contact point to contact point on the rounded cutting edge from the tooth root to the tooth tip of the cutting tooth or vice versa. On account of the rotational movement of the virtual tool 1v, the virtual engagement line describes a complex curve in space. The position of a virtual engagement point in space can be readily calculated in dependence on the considered virtual contact point of the virtual tool 1*v* if the tool design is known.

The virtual workpiece 3*v* and the virtual tool 1*v* are oriented and positioned in FIG. 1*a* in such a manner that the laser beam 12 is aligned substantially parallel to one of the flanks of the virtual workpiece 3*v* along the helix angle thereof and extends precisely through the virtual engagement point, in the rolling position in which a virtual contact point of the virtual tool 1*v* contacts the virtual workpiece 3*v* and coincides with the virtual engagement point. The laser beam 12 therefore extends in FIG. 1*a* through a point on the cutting edge of the virtual tool 1*v*, at which said cutting edge contacts the flank of the virtual workpiece 3*v*, tangentially to the flank of the virtual workpiece 3*v* at the virtual contact point thereof and tangentially to the cutting edge of the virtual tool 1*v* at the virtual contact point thereof. The alignment and position of the virtual tool 1*v* necessary for this depends on each virtual contact point along the cutting edge. A virtual contact point in the vicinity of the tooth root of the cutting tooth thus requires a different orientation and positioning of the virtual tool 1*v* than a virtual contact point in the vicinity of the tooth tip. The necessary alignment and position of the virtual tool 1*v* can readily be calculated for each virtual contact point on the cutting edge.

For a measurement on the real tool 1, the real tool is moved precisely into the position and orientation in which the virtual tool 1*v* is situated in FIG. 1*a*. The real tool is then rotated about the tool axis B. and the rotational angles at which the cutting teeth of the real tool interrupt the laser beam 12 are observed. If the cutting edge geometry of the real tool 1 does not match the cutting edge geometry of the virtual tool 1*v* at the selected contact point, the rotational angles determined in this manner will deviate from the rotational angles where the virtual tool 1*v* would interrupt the laser beam. Said deviation is a measurement for the deviation of the real cutting edge geometry from the virtual cutting edge geometry at the selected virtual contact point.

Said measurement is now repeated for further virtual contact points along the cutting edge of the virtual tool 1*v*.

During the measurement, the laser beam 12 describes in each case a circular path in the reference plane Bxy when viewed from the rotating tool. The radius of the circular path depends on the virtual contact point on the cutting edge of the virtual tool 1*v*. For a virtual contact point on the tooth root of the cutting tooth, the radius is smaller than for a virtual contact point on the tooth tip. The corresponding circular path is designated below as a measuring track. FIG. 1*a* shows one of said measuring tracks which is provided with the reference R3. In practice, measurements for at least five measuring tracks are carried out with different radii, the contact points defining different radii of the corresponding measuring track. For each contact point or each radius of a measuring track, the measurement is effected in another relative position between the tool 1 and the laser bridge 11. Said position is chosen such that the measurement takes place at the point on the cutting edge at which the cutting edge also acts in the case of the actual machining, namely at the contact point during machining. As a result, measuring errors are avoided, which would arise if the tool were simply always measured in the same orientation for different virtual contact points on the cutting edge. This is explained in more detail below by way of FIGS. 2 and 3.

Figure 2:
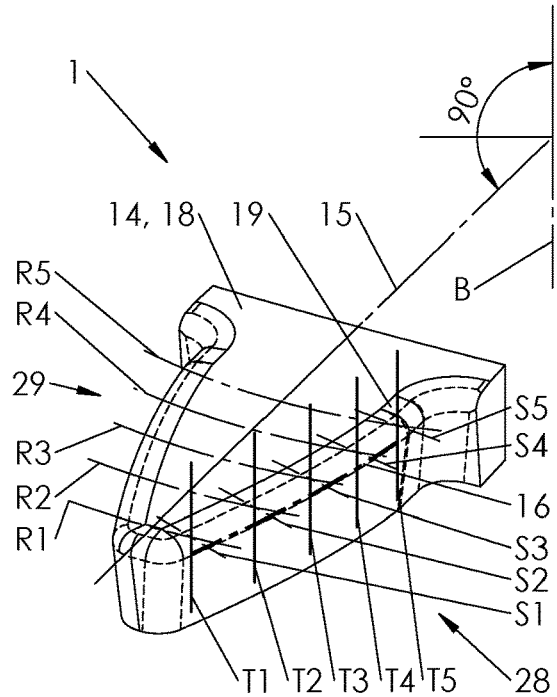
FIG. 2 shows a perspective view of a cutting tooth of a hob peeling tool with the tool spindle having a vertical orientation, axially parallel cylindrical sensing surfaces abutting against the cutting edge in fixed orientation.

FIG. 2 shows one single cutting tooth 14 of a hob peeling tool 1 with the tool spindle 2 having a vertical orientation 13, the cutting tooth having been produced precisely according to the tool design. The cutting tooth 14 comprises a left-hand cutting edge 28 and a right-hand cutting edge 29. A cutting surface chamfer 19 is realized in each case between the cutting surface 18 and the cutting edge. FIG. 2 explains a method which is not according to the invention where the measurements are effected on the cutting edges without the progression of the contact points over the cutting edges being taken into consideration. In the method in FIG. 2, the measurement is always effected in the same relative orientation between tool 1 and laser beam 12 for all positions along the cutting edge. To this end, the laser beam 12 in FIG. 2 is understood as a cylindrical sensing surface and is designated as T1 to T5 in dependence on the relative position between tool 1 and laser beam. The cylindrical sensing surfaces T1 to T5 are always parallel to the tool axis B in the case of said method, irrespective of the position to be measured on the respective cutting edge. When the tool is rotated through the laser beam, the laser beam or the sensing surface describes a circular path R1 to R5 relative to the tool. In this case, the cutting edge 28 always interrupts the laser beam at its outermost edge, i.e. at the edge 16 toward the adjoining clearance surface, and also only unblocks it again at its outermost edge. The point at which the cutting edge 28 interrupts the laser beam does not correspond, however, to the actual contact point between cutting edge and workpiece during workpiece machining: The actual contact point is normally located further away from the clearance surface on the rounded cutting edge on account of the skew arrangement of tool and workpiece. It can be seen in FIG. 2 that measuring errors can arise as a result of said deviation. As the radius, with which the cutting edge is rounded, is usually within the micrometer range, measuring errors are made within the micrometer range as a result of said conventional method.

The method according to the invention is explained in more detail below by way of FIG. 3 and FIGS. 3*a* to 3*e*. FIG. 3, once again, shows a cutting tooth 14 which has been produced precisely according to the tool design; however, the tooth is shown in an orientation which is tilted by an angle Σ. On the left-hand cutting edge 28 (also designated below in a simplified blanket manner as cutting edge S) of said tooth 14 are provided contact points m1 to m5, at which the cutting edge would contact the tooth flank of a finished workpiece during workpiece machining, each of the contact points m1 to m5 corresponding to a different rolling angle between tool and workpiece. The contact points ni1 to m5 can readily be calculated from the tool design. They lie on a path which extends across the rounded cutting edge. The connection between said contact points m1 to m5 is formed by the compensating curve 17. It can be seen that said path deviates considerably from the edge 16 in FIG. 2.

The method according to the invention takes said deviation into consideration. The tool axis is tilted for each contact point m1 to m5 about a different angle Σ in relation to the vertical so that the laser beam 12 or the cylindrical sensing surfaces T1 to T5 contact the cutting edge tangentially in each case at the relevant contact point m1 to m5. The values of the angle Σ necessary for this can also be readily calculated based on the tool design. In this way, the geometry of the cutting edge along the path of the contact point can be precisely determined as a result of the measurement. Herein, the following applies: the surface normal of the cutting edge is always perpendicular to the machined flank of the workpiece at the respective contact point m1 to m5, and the laser beam or the cylindrical sensing surfaces T1 to T5 are correspondingly always at right angles to said perpendicular.

FIGS. 3*a* to 3*e* show schematic representations of the geometric conditions at the contact points m1 to m5 in enlarged sections in planes S1 to S5. In a representative manner for FIGS. 3a to 3d, FIG. 3e shows all reference symbols that are relevant here (contact point m5, radius r5, cutting surface 18, cutting surface chamfer 19, spatial movement path 24 of the contact point, perpendicular 32 on the cutting edge). It can be seen how the position of the contact point m1 to m5 changes on the curved portion from contact point to contact point, and how the direction of the cylindrical sensing surface T1 to T5, tangential thereto, changes correspondingly relative to the tool axis B. If the rounded right-hand virtual cutting edge 29 is to be measured, a further measuring cycle is then effected at changed axis positions.

Figure 4:
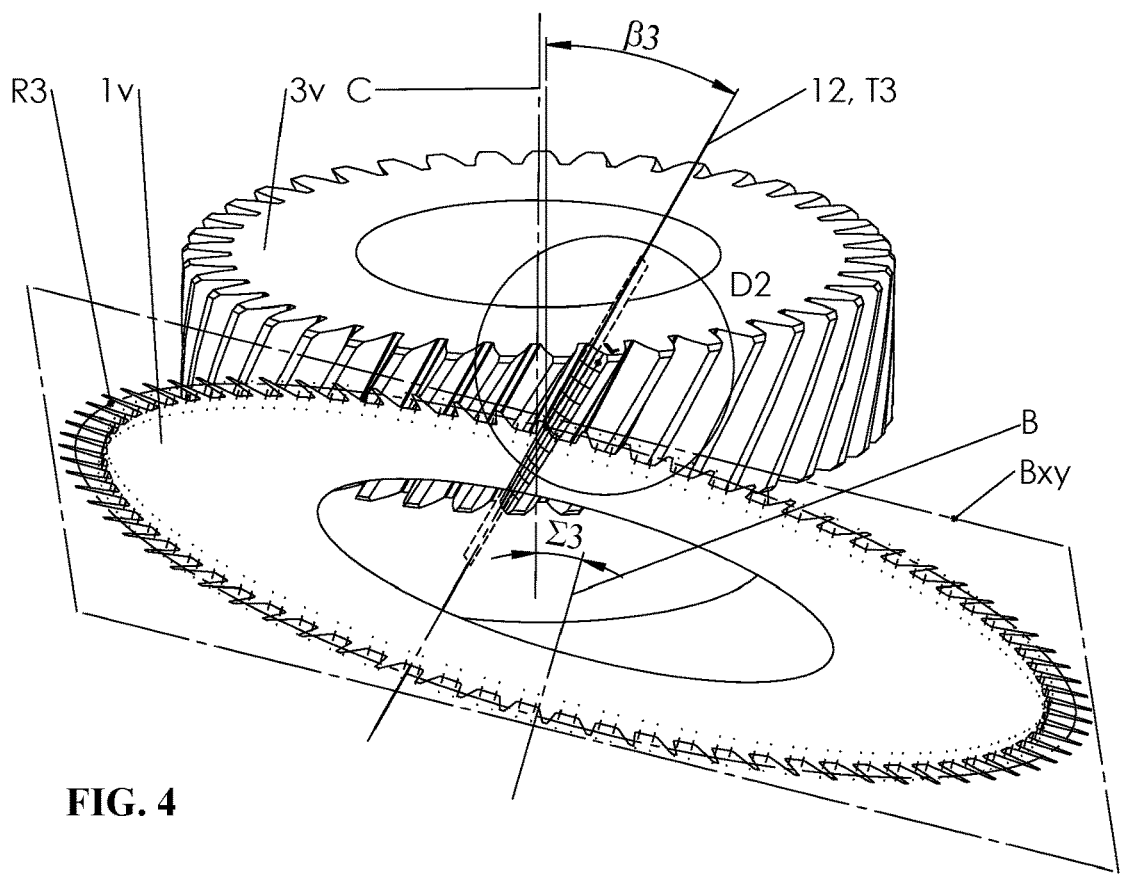
FIG. 4 shows a perspective view of a virtual workpiece in engagement with a virtual tool for illustrating the position of a cylindrical sensing surface.
Figure 4A:
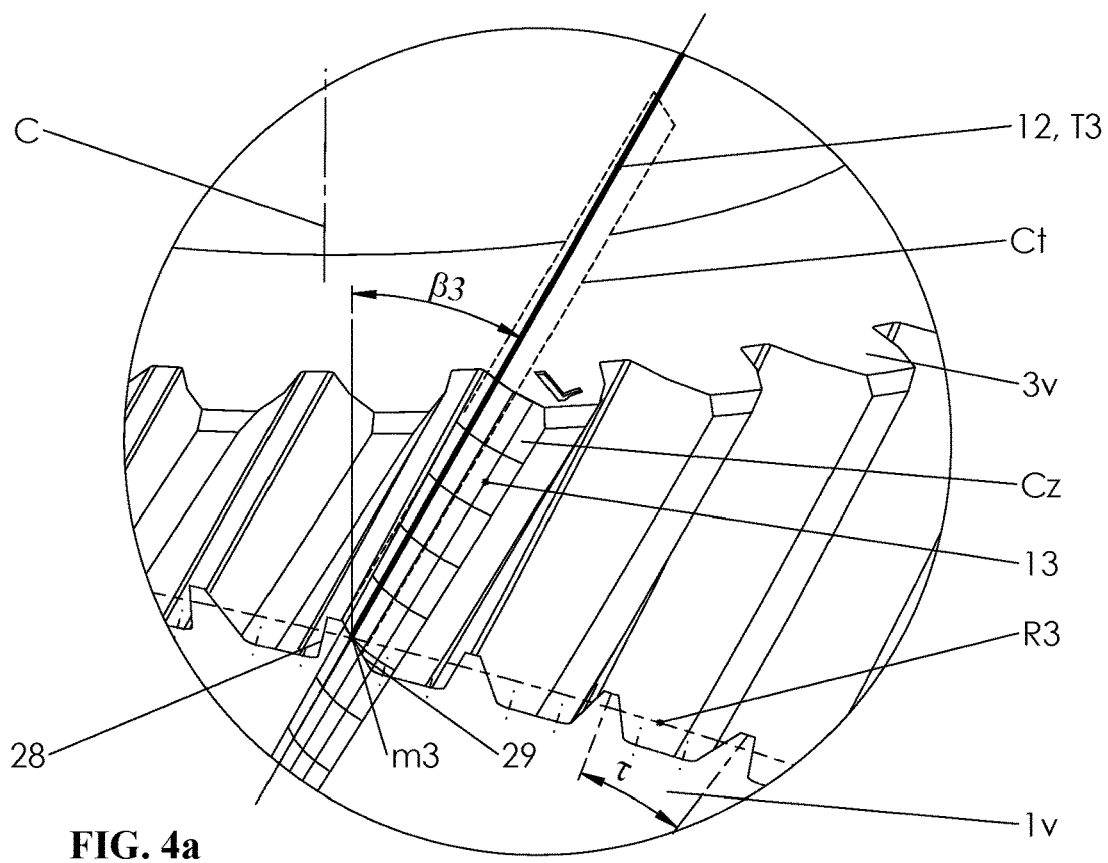
FIG. 4a shows an enlarged view of a detail of FIG. 4 in the region D2, surface curves also being shown to show a curved tooth flank in a better manner.

FIGS. 4 and 4a show a virtual workpiece 3v which is machined by the virtual tool 1v. The virtual workpiece 3v corresponds to a workpiece finished with the virtual tool 1v. The position of a cylindrical sensing surface, here the sensing surface T3 or the laser beam 12, in space will be explained again by way of said representation. The tool axis B of the virtual tool 1v is pivoted into its measuring position about the angle Σ3. The right-hand cutting edge 29 of the virtual tool 1v contacts the curved tooth flank Cz of the virtual workpiece 3v at the contact point m3. The curvature is indicated by the surface curves 13. The sensing surface T3 of the laser beam 12 now extends such that the sensing surface T3 lies on the curved tooth flank Cz in the tangential plane Ct associated with the contact point m3 and is aligned in the flank direction, i.e. in the direction of the helix angle (indicated here by the angle β3).

Figure 5:
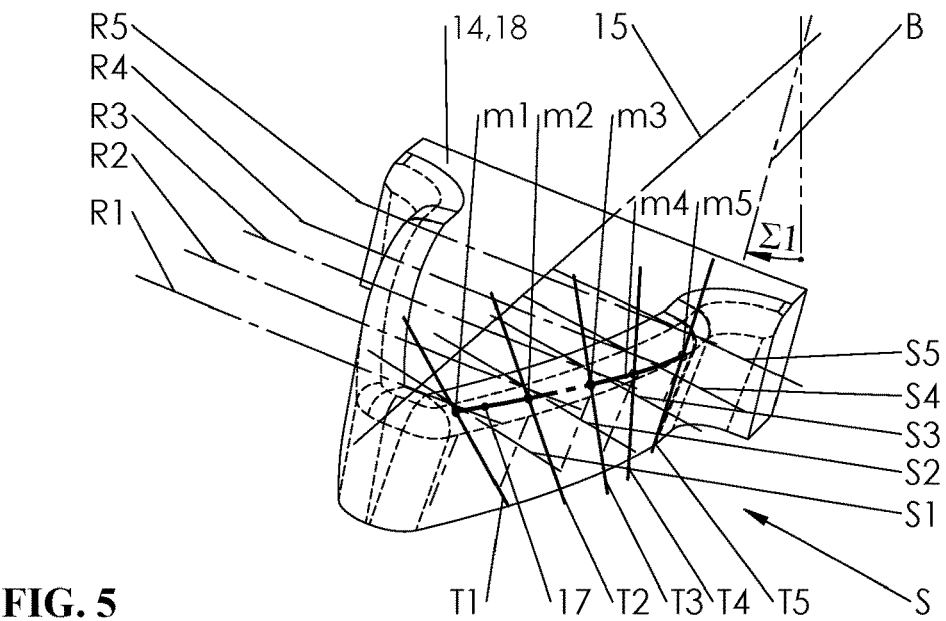
FIG. 5 shows another perspective view of a cutting tooth according to FIG. 3 with five measuring tracks and associated cylindrical sensing surfaces at the contact points on the active cutting edge.
Figure 5A:
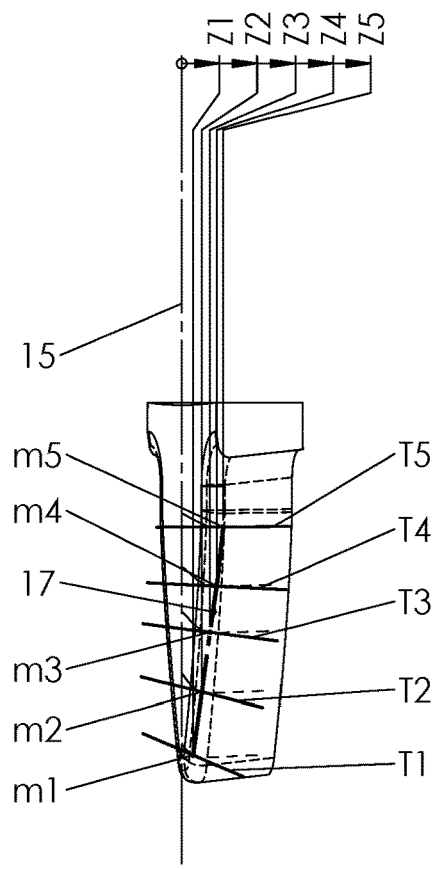
FIG. 5a shows a side view of a cutting tooth according to FIG. 5 with associated Z values of the five contact points.
Figure 5B:
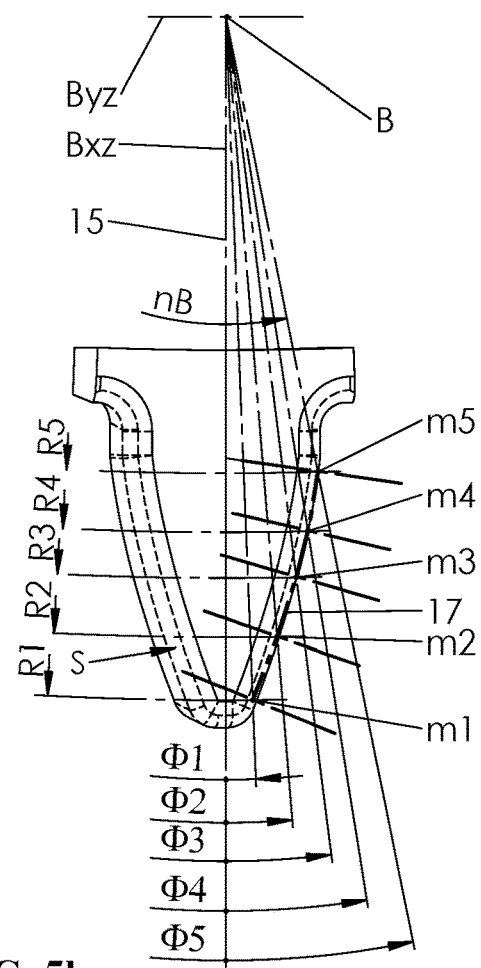
FIG. 5b shows a top view of a cutting tooth according to FIG. 5 with five measuring tracks and associated angular positions.

FIGS. 5, 5a and 5b show various views of a cutting tooth 14 with five contact points m1 to m5, five measuring tracks R1 to R5 associated therewith and five cylindrical sensing surfaces T1 to T5 associated therewith. FIG. 5 shows a perspective view analogously to FIG. 3. FIG. 5a shows the side view of said cutting tooth 14. It can be seen that the individual contact points m1 to m5 each have different positions Z1 to Z5 along the Z axis. They do not lie, therefore, in a common plane perpendicularly to the Z axis. Consequently, the Z position of the tool has to be modified for each of the measurements at the various contact points m1 to m5.

FIG. 5b shows a top view of the cutting tooth 14. If the hob peeling tool 1 with the cutting tooth 14 is moved past the cylindrical sensing surface T1 for example on the measuring track R1, the angle of rotation Φ1, at which the cutting edge contacts the sensing surface T1 at the contact point m1, can be determined by a 0 signal of the laser bridge being detected. The angles of rotation Φ2 to Φ5 are detected analogously for the further measuring tracks R2 to R5, the cylindrical sensing surfaces T2 to T5 each having a modified angular position relative to the tool axis B. The detection of said angles of rotation enables a precise image of the contact points on the cutting edge S.

Figure 3:
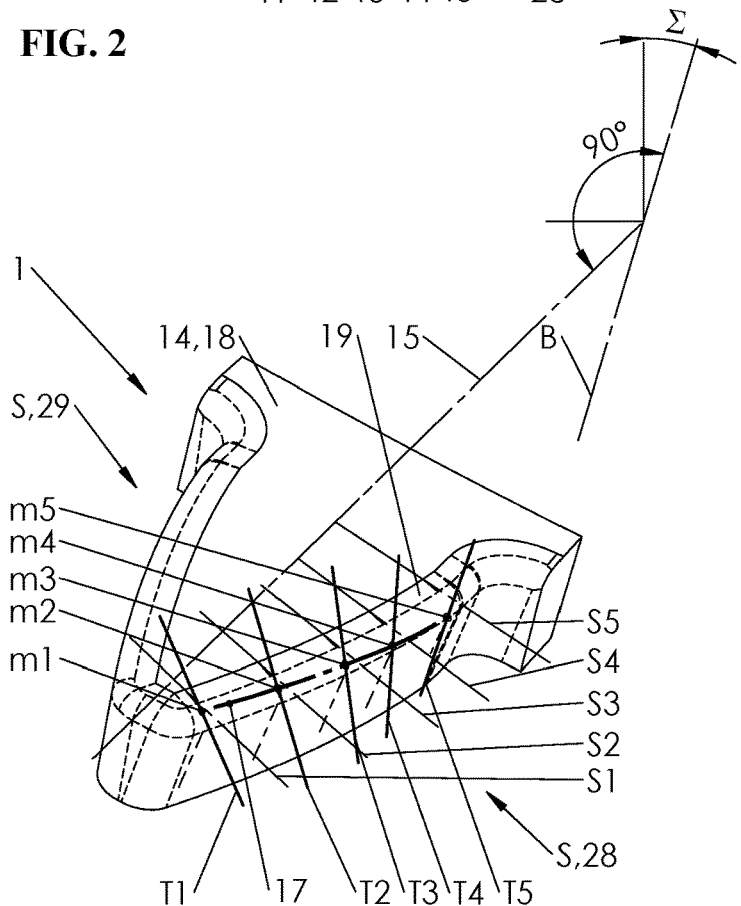
FIG. 3 shows a perspective view of a cutting tooth of a hob peeling tool having a skew orientation (analogous to the orientation when machining), cylindrical sensing surfaces abutting against the cutting edge in various orientations.
Figure 3E:
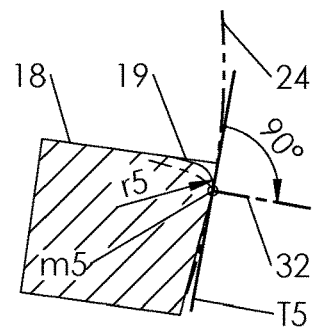
FIG. 3e shows an enlarged sectional view in plane S5 of FIG. 3 at contact point m5.
Figure 3D:
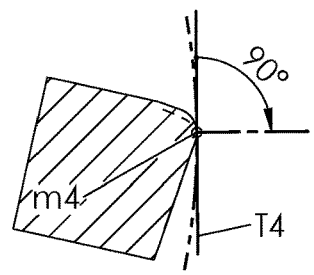
FIG. 3d shows an enlarged sectional view in plane S4 of FIG. 3 at contact point m4.
Figure 3C:
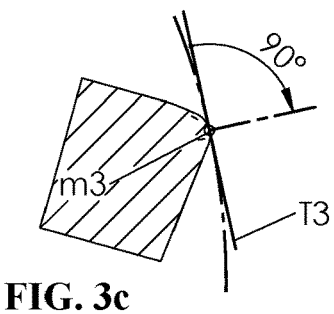
FIG. 3c shows an enlarged sectional view in plane S3 of FIG. 3 at contact point m3.
Figure 3B:
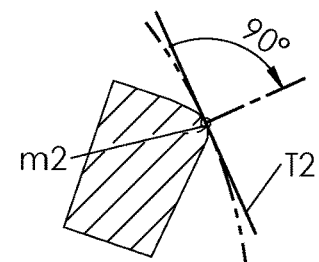
FIG. 3b shows an enlarged sectional view in plane S2 of FIG. 3 at contact point m2.
Figure 3A:
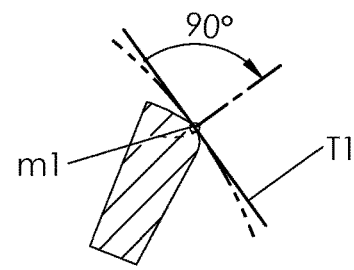
FIG. 3a shows an enlarged sectional view in plane S1 of FIG. 3 at contact point m1.
Figure 6:
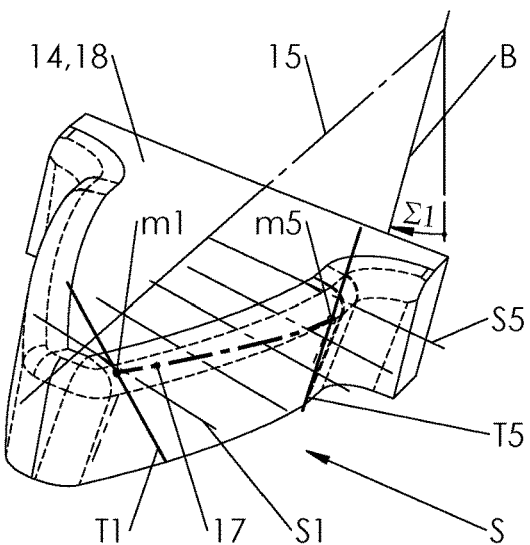
FIG. 6 shows a further perspective view of a cutting tooth according to FIGS. 3 and 5.
Figure 6A:
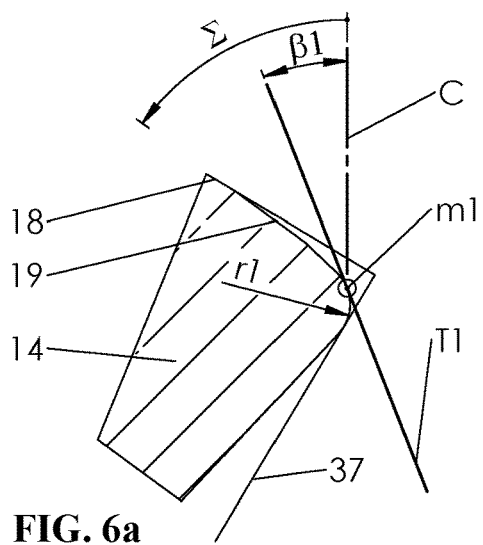
FIG. 6a shows a schematic sectional view in plane S1 of FIG. 6 with a skew orientation (analogous to the axis position when machining)
Figure 6B:
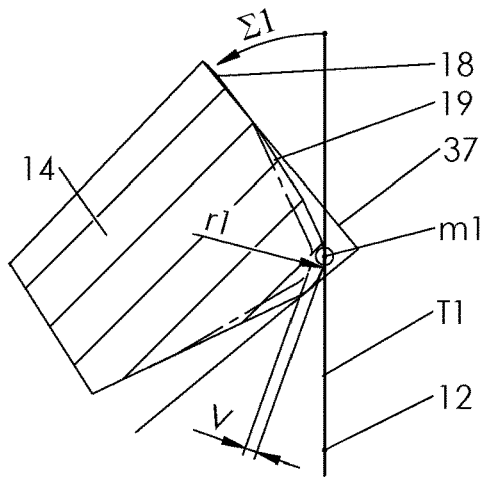
FIG. 6b shows a schematic sectional view in plane S1 of FIG. 6 with tangentially abutting laser beam at contact point m1 in the vertical orientation.

FIG. 6 shows once again a perspective view of a cutting tooth 14 analogously to FIG. 3, only two contact points m1 and m5 being shown with associated cutting planes S1 and S5 and associated sensing surfaces T1 and T5. The sensing surfaces can be realized once again by a laser beam 12. FIGS. 6a to 6d show schematic representations of sections through the cutting tooth 14 in the planes S1 and S5, the following explanations being applicable:

FIG. 6a shows, in plane S1, a section in the axis position for machining and FIG. 6b in the axis position for measuring the contact point m1.

Figure 6C:
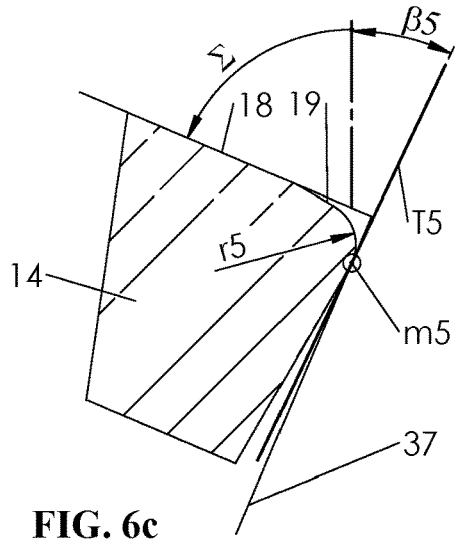
FIG. 6c shows a schematic sectional view in plane S5 of FIG. 6 with a skew orientation (analogous to the axis position when machining)
Figure 6D:
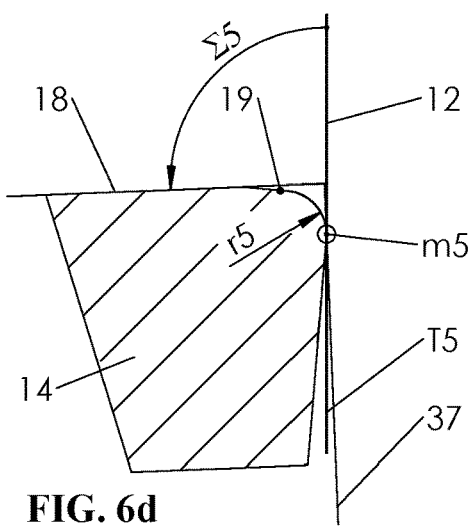
FIG. 6d shows a schematic sectional view in plane S5 of FIG. 6 with tangentially abutting laser beam at contact point m5 in the vertical position.

FIG. 6c shows, in plane S5, a section in the axis position for machining and FIG. 6d in the axis position for measuring the contact point m5.

In the relevant axis position for measuring, the cylindrical sensing surfaces T1 and T5 are always arranged in a spatially fixed and vertical manner.

The available machine axes are used in order to move the tool from the axis position for machining to the axis position for measuring the first contact point m1 and to align it relative to the cylindrical sensing surface. To this end, the tool spindle 2, and depending on the realization of the invention also the workpiece spindle 4, moves to the measuring position Mp by means of the translational axes X and Y. The tool spindle 2 is initially still at the original setting angle Σ. By means of the further axis Z, the first contact point m1 on the cutting tooth 14 is moved into the center of the laser beam 12 at the level of the horizontal plane Mxy (cf. FIG. 1a). Where required, the X and Y axes are used once again for this purpose. When the axes are oriented for measuring, the tool spindle 2 pivots by means of the pivot axis A into the new setting angle Σ1, the previous tool setting angle Σ being corrected by the helix angle β1 at the contact point m1. As a result, the settings are transformed from the axis position for machining into the axis position for measuring at the selected contact point. Once pivoted to the tool setting angle Σ1, the tool spindle 2 performs at least one full spindle revolution at a defined rotational speed nB, and the angles of rotation Φ, at which the laser beam is interrupted by the cutting edge, are detected. After the first measurement, the tool spindle 2 is moved into the axis position for measuring at the next contact point m2, and the sequence is repeated analogously up to the measurement at the contact point m5. The sequence of said measurements can also be effected in reverse order. Once the contact points on one side of the cutting edge have been measured, the contact points on other side of the cutting edge are measured in an analogous manner. The same or a modified direction of rotation of the tool spindle 2 can be used for this purpose.

With a laser beam 12 which works in a contactless manner, spindle rotational speeds nB greater than 60 U/min can be used without any problems when measuring. Consequently, a complete measurement with at least five measuring tracks R1 to R5 is able to be carried out in less than between 5 and 10 seconds. Usually, after five measuring cycles, sufficient measured values are received and stored in tabular form in the CNC controller 8. Said values can then be evaluated as required using methods that are usual in measurement technology. Where required, the number of measuring cycles can be increased. In the present example, the laser beam 12 or the sensing surface T1 to T5 is arranged vertically. Instead of this, however, the laser beam can also have any other desired orientation in space. In the case of a laser beam arranged in another manner or a sensing surface arranged in another manner, the transformation of the settings from the axis position for machining into the axis position for measuring, which is associated with the contact point to be measured in each case, is effected in an analogous manner.

Figure 7:
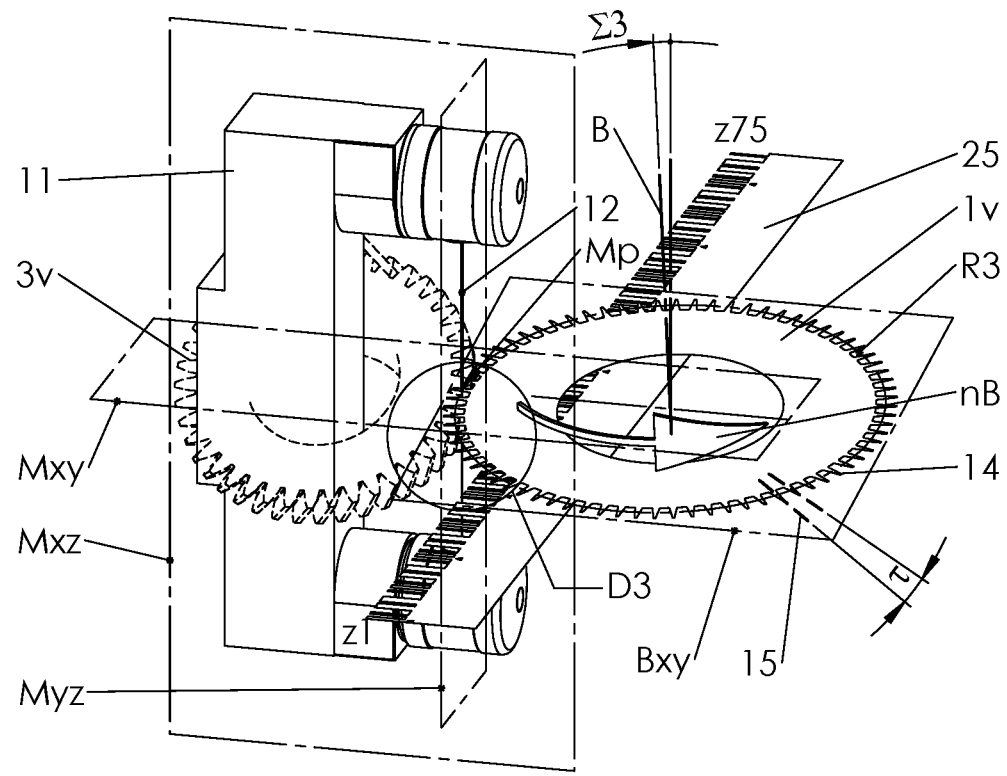
FIG. 7 shows a perspective view of a vertically arranged laser bridge when testing a hob peeling tool and a schematic representation of a corresponding L/0-signal band.

FIG. 7 shows a measuring device 11 with a vertical laser beam 12, a virtual hob peeling tool 1v with the contact point m3 being situated in the measuring position Mp. The virtual hob peeling tool 1v, in this connection, can also be understood as a simplified representation of a real tool 1 in a transverse cross-sectional plane Bxy. The spindle axis B or the transverse cross-sectional plane Bxy is pivoted by the previously explained tool setting angle Σ3. The measuring position Mp lies at the fixed intersection point of the planes Mxy, Mxz and Myz. Also shown is a virtual workpiece 3v which is in rolling engagement with the virtual hob peeling tool 1v, the laser beam 12 contacting the tooth flank Cz tangentially at the common contact point m3. Said virtual workpiece 3v is shown purely for visual explanation.

Figure 7A:
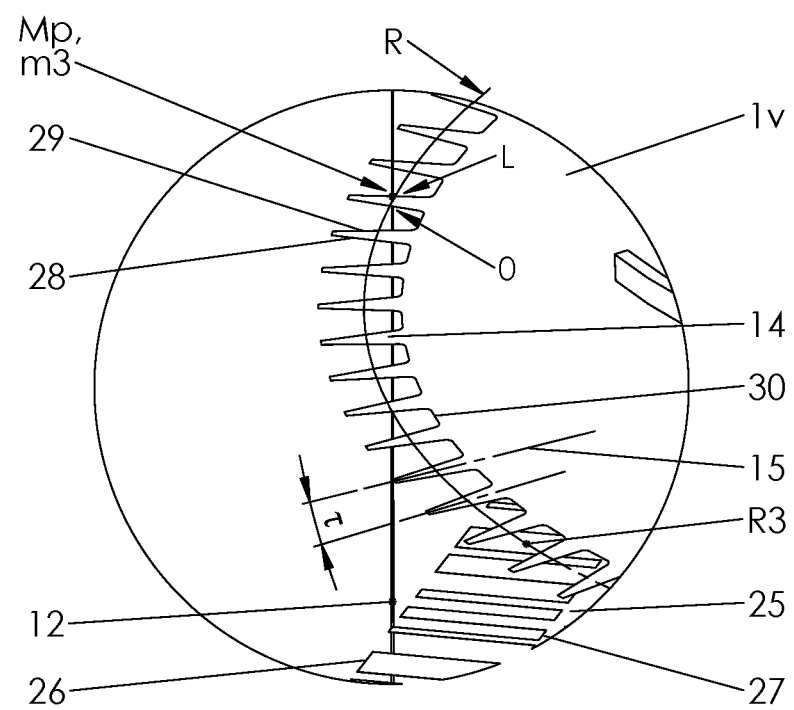
FIG. 7a shows an enlarged view of a detail of FIG. 7 in the region D3, schematic representations of L and 0 signals and of the concentricity of the tool being shown.

The virtual hob peeling tool 1v rotates past the laser beam 12 at the spindle rotational speed nB, an L signal 26 and a 0 signal 27 being generated alternatingly per cutting tooth 14. The cutting tooth 14 interrupts the laser beam 12, a 0 signal 27 being generated. Said laser beam 12 is unblocked again in the tooth gap, and an L signal 26 is generated. The corresponding angular position of the CNC tool spindle B is detected both in the case of the L signal 26 and in the case of the 0 signal 27. It should be noted that in the case of the first measuring cycle for, for example, the right-hand cutting edge 29, only the 0 signals 27 are evaluated and stored in tabular form in the CNC controller 8. In the second measuring cycle, with the same direction of rotation of the tool spindle B but a modified axis position for the left-hand cutting edge 28, only the L signals are evaluated and also stored in tabular form. The measured values are assigned to each measuring track in the CNC controller 8 and a possible final result is shown schematically in FIG. 8. FIG. 7a additionally shows by the way of example of a first cutting tooth 14 which has been pivoted away from the laser beam 12 that, with said first measurement, a first cutting tooth center 15 in a skew position can be defined by means of L/0 signals. If said center 15 is used as a reference value, the following angular positions of the tool spindle B can then refer to said value.

In this case, determining each individual cutting tooth center 15 in only one measuring track R3 and forming a mean value from this can suffice. If said mean value is within a defined tolerance range Δ, machining can then safely start. A measurement in only one measuring track can also suffice for measuring the concentricity R, the concentricity measurement being effected analogously to the detecting of the cutting tooth center. To detect the form of the cutting edge of the cutting tooth 14, however, measurements in multiple, preferably at least five, measuring tracks R1 to R5 are necessary.

The L/0 signals at a tooth-shaped tool 1v can also be shown schematically as a linear L/0 signal band 25. With 75 cutting teeth z1 to z75 on the tool 1v, 75 times L and 0 signals are also produced. The measured deviations can consequently be shown very well in a visual manner, in particular on the screen of a control panel 9.

FIG. 7a shows an enlarged view of a detail in the region 173 at the contact point m3. The cutting edges 28, 29, 30 and 31 are shown as an example in said view for explanation purposes. Additionally shown are: virtual tool 1v, laser beam 12, cutting tooth 14, cutting tooth center 15 in a skew position, L and 0 signals 26, 27, contact point m3, measuring position Nip, concentricity R, measuring track R3 and pitch angle τ.

Figure 8:
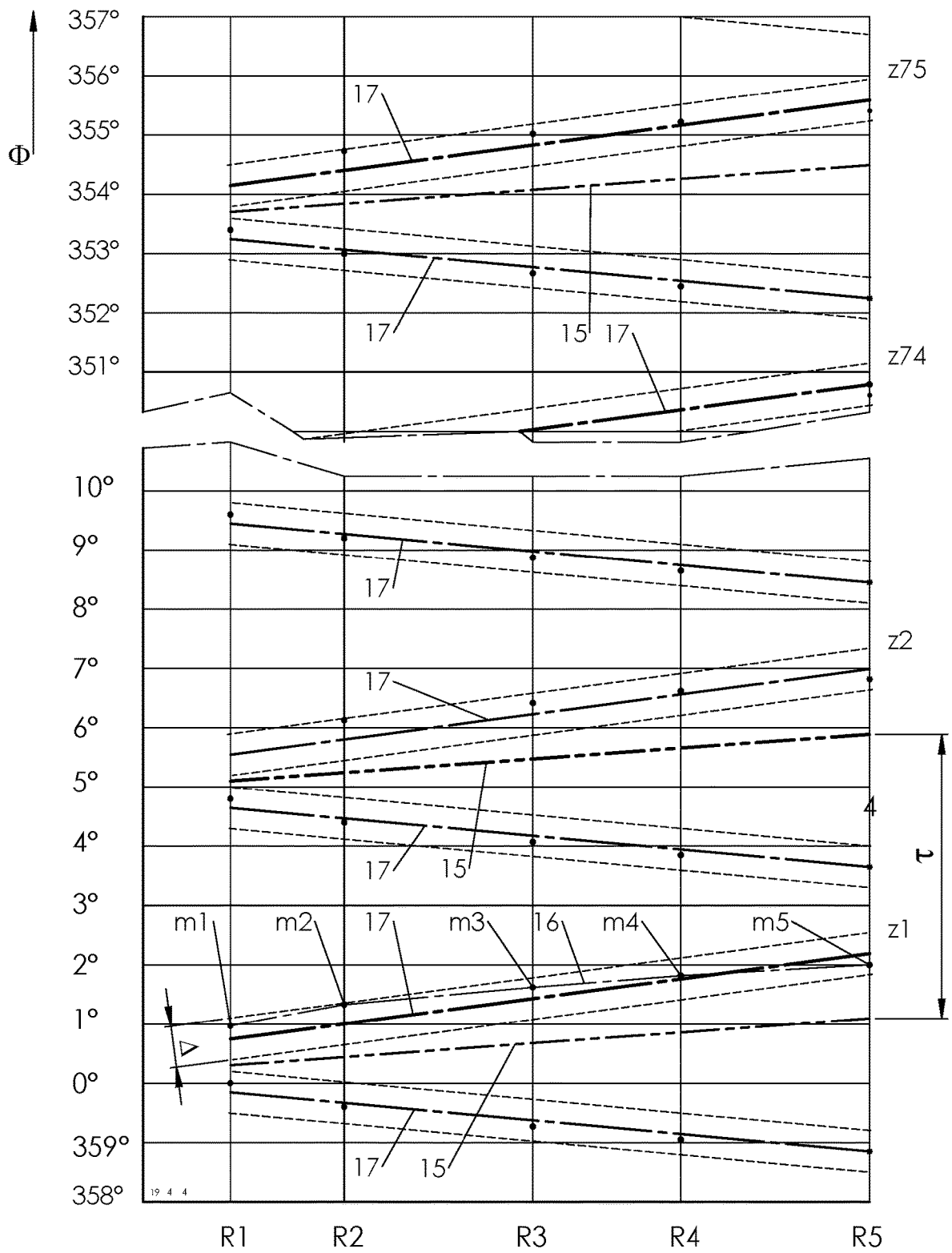
FIG. 8 shows a diagram schematically representing the measured values at the virtual contact points of a hob peeling tool configured with, for example, 75 cutting teeth, actual values, calculated compensating curve, cutting tooth center, tooth pitch and a tolerance range being shown schematically.

FIG. 8 shows a schematic representation of the angular positions Φ of the L/0 signals for each measuring track R1 to R5. As already mentioned, said angular positions can be stored in the CNC controller 8, shown on the screen of the control panel 9 and used as required for various measuring tasks. By means of standard mathematical processes of equalization calculus, it is possible to determine, for example, the concentricity R, the cutting tooth center 15 and/or the pitch angle τ in a relatively simple and quick manner using the least squares method. Multiple, preferably at least five, measuring tracks R1 to R5 are run for scanning the three-dimensional cutting edges S. The geometry of the cutting edge S with the compensating curve 17 can then also be determined from the measured values using the least squares method. A comparison with an ideal cutting edge 21 calculated beforehand is then possible. To check the measurement results, a further measuring track can be run very rapidly. Predefined tolerance bands (tolerance margin Δ) are shown by the dotted lines.

FIGS. 9, 9a, 10 and 10a illustrate that the laser bridge 11 does not necessarily have to be aligned in a vertical manner. The laser bridge, as described previously, is aligned in FIGS. 9 and 9a in such a manner that the laser beam 12 extends vertically, parallel to the Z axis. If the laser beam 12 is precisely cylindrical or if the region of the laser beam 12 that is effective during the measurement is precisely cylindrical in form, the precise position of the workpiece 1 along the Z axis is not important in the case of said arrangement. Precise positioning in the Z direction is therefore not necessary. In particular, the tool 1 does not necessarily have to be situated in the reference plane Mxy in FIG. 1a for the measurement. In FIGS. 10 and 10a, in contrast, the laser bridge 11 is tilted out of the vertical about the Y axis at the angle δ. As a result, the risk of a collision between the laser bridge 11 and the tool holder or tool shank of the tool spindle 2 is reduced. However, the laser beam 12 now no longer extends parallel to the Z axis. The tool spindle 2 has consequently to be positioned during the measurement with reference to the Z direction such that the contact point to be measured is situated precisely in the reference plane Mxy on the virtual cutting edge. With said alignment of the laser beam 12, precise positioning of the tool along the Z direction is therefore necessary.

Figure 11:
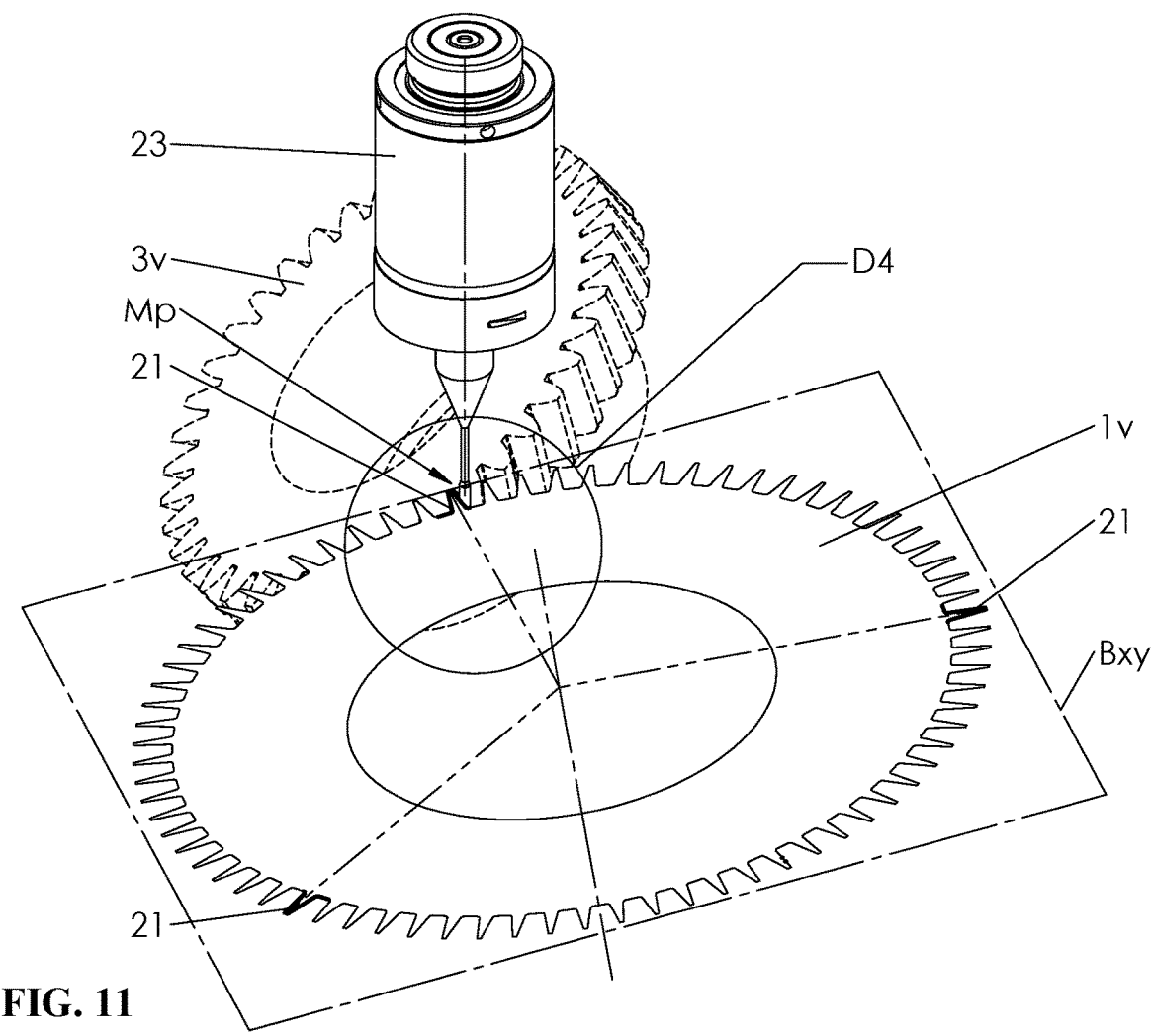
FIG. 11 shows a perspective view of an arrangement with a scanning, tactile sensing device.

FIG. 11 shows, as an alternative to this, a hob peeling tool 1v being measured by means of a tactile sensing device 23. Preferably the cutting tooth 14 is scanned. It is not possible to rotate the hob peeling tool 1v freely during the measurement on account of the contacting measurement. In the case of the scanning operation, the CNC axes A, 13 and X are moved synchronously and relatively slowly. The Z axis does not necessarily have to be moved. Where required, the Y axis can also be included in a synchronous manner. In practice, corresponding measuring curves 21 can be measured at at least three cutting teeth 14. The sensing device 23, in this case, also uses a cylindrical sensing finger with a cylindrical sensing surface T1.

Figure 11A:
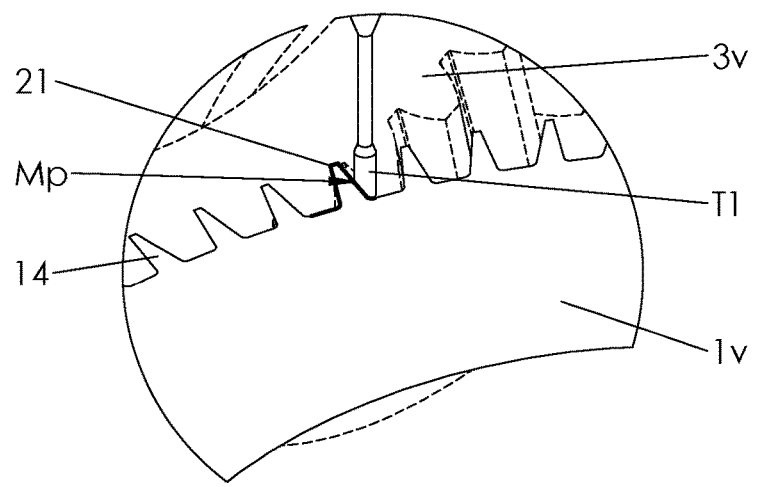
FIG. 11a shows an enlarged view of a detail of FIG. 11 in the region D4.

FIG. 11a shows the engagement in the region D4 of FIG. 11 between the cylindrical sensing surface T1 of the tactile sensing device 23 and the cutting tooth 14 to be scanned, in the course of said scanning, the cylindrical sensing surface T1 of the tactile sensing device 23 also rests tangentially on the rounded cutting edge S of the hob peeling tool 1v. However, scanned measured values 21, which relate to the associated angular position Φ about the tool axis B, are generated in place of the L/0 signals.

FIGS. 12 and 13 show possible arrangements of the laser bridge 11 on hob peeling machines which are installed on the platform of traditional gear cutting machines.

FIG. 12 illustrates a variant of a hob peeling machine where the measuring device in the form of a laser bridge 11 is arranged on a movable carrier in the form of a workpiece carrier 33. The workpiece carrier 33 is pivotable about a vertical axis C* into multiple positions. A machine concept with such a movable workpiece carrier is disclosed in U.S. Pat. No. 6,565,418 B1. A workpiece spindle 4 is also arranged on the workpiece carrier 33, offset to the laser bridge 11 with reference to the pivot direction (offset by 90° in the present example). As a result of said workpiece carrier 33 being pivoted about the axis C*, either the workpiece spindle 4 or the laser bridge 11 can be moved into a position in which it interacts with the tool 1. The workpiece carrier can support a second workpiece spindle (not shown in the drawings) which is arranged offset to the first workpiece spindle by 180°, In the representation in FIG. 12, said second workpiece spindle is situated on the rear side of said workpiece carrier. In this way, machining can be effected on one of the workpiece spindles whilst a finished workpiece can be replaced by a workpiece that is to be newly machined on the other workpiece spindle. As a result, unproductive idle times are avoided. In said machine concept, the tool spindle 2 is accommodated in a movable hob peeling head 35 which is arranged on the tool carrier 34 which is situated on a machine bed 6 so as to be displaceable.

FIG. 12a shows an enlarged detail from FIG. 12 in the region D5. As can be seen from said detail, the laser beam 12 of the laser bridge 11 in the present example is not aligned vertically but preferably is at a tilt angled to the vertical. The achievement here is that the laser bridge 11 is able to remain within the contour of the workpiece carrier 33, as a result of which the sealing of the working space is made easier.

Another variant of the hob peeling machine is shown in FIG. 13. Said hob peeling machine is based on a machine concept as is disclosed in U.S. Pat. No. 5,857,894. In said embodiment, the laser bridge 11 is arranged in a stationary manner on a machine bed 6, and the movements necessary for measuring are carried out by a displaceable and pivotable tool carrier 34. The tool spindle 2 in said machine concept is accommodated in a movable hob peeling, head 35, which is arranged on said tool carrier 34, which is situated on a machine bed 6. The tool carrier 34 is pivotable about a vertical axis C* between a machining position, which is not shown, and the measuring position shown in FIG. 13. In the machining position, the tool 1 is arranged such that it is able to interact with the workpiece 3 in order to machine said workpiece. In the measuring position, the tool 1 is arranged in contrast such that it is able to interact with a measuring device in the form of a laser bridge 11. In the present example, the pivot angle between the machining position and the measuring position is 180°. Other pivot angles, however, are obviously also conceivable.

FIG. 13a shows an enlarged detail from FIG. 13 in the region D6. As can be seen from said detail, the laser beam 12 of the laser bridge 11 is not aligned vertically but is at an angle δ to the vertical in the present example also. A stationary, vertical arrangement of the laser bridge 11, however, is also conceivable.

Automated tool measurements in a gear cutting machine 22 for hard machining require highly precise relative movements between the described operating pair of tool 1 and measuring device in measuring position Nip. The available relative movements between the other operating pair of tool 1 and workpiece 3 already have, in general, a high level of basic geometric accuracy within the micrometer range or for rotational axes within the range of angular seconds. To ensure a highly precise measurement in a reliable manner within the working space of a hob peeling machine 22, the measuring position Mp should be calibrated automatically at the start of each machining and, where required, also from time to time. A possible procedure for this purpose is explained below by way of FIGS. 14, 14a and 14b.

FIG. 14 shows a calibrating mandrel 36 in a hob peeling machine 22, which is not shown, with a system of coordinates for the axes X, Y and Z. The calibration mandrel 36 with a defined height h (see FIG. 14a) and a defined calibration diameter ØD (see FIG. 14b) is received by the tool spindle 2, which is not shown, and moved into the calibration plane EK at position Z1*. The measuring position Mp of the laser bridge 11 is also situated in said plane. When, therefore, the calibration mandrel 36 is first started from a suitable X position in FIG. 14a and is moved with the Y axis in the direction of the measuring position Mp, it intersects the laser beam 12 with its calibration diameter ØD, and said laser beam is blanked out. In this case, a 0 signal 27, which marks the Y position Y1*.0 in the CNC controller 8, is generated in the laser bridge 11. When the Y axis moves further, the calibration diameter ØD unblocks the laser beam 12 again and, analogously to the 0 signal 27, an L signal 26 is generated, which marks the Y position Y1*.L in the CNC controller 8. The center between both Y positions is taken by means of the CNC controller 8 to define the distance ym between laser beam 12 and workpiece axis C. However, this is not yet sufficient for the highly precise calibration of the measuring point Mp. The precise angular orientation ε of the laser beam 12 in the plane Y-Z must also be detected or set. Within the framework of the invention, the measurement of a hob peeling tool 1 could be effected at any desired angular orientation ε, the vertical orientation naturally being used in a preferred manner. Consequently, a second calibration step at a higher Z position Z2* is sensible, the Y positions Y2*.0 and Y2*.L being marked and evaluated in an analogous manner. In the case of even greater accuracy requirements, calibration steps can also be carried out in further Z positions. The CNC controller 8 is able to determine the angular orientation ε in a highly precise manner using said values. If the laser beam 12 does not intersect the calibration diameter ØD in the case of said calibration along the Y direction, the position along the X direction must be adjusted.

The next step during calibration is effected along the X direction for determining the distance xm and the angular position δ, shown in FIG. 14b. As the ym distance of the laser beam 12 to the tool axis C has been determined in the preceding steps for calibration, the Y axis with tool spindle 2 can move the rotationally symmetrical calibration mandrel 36 to said position. At the start, said tool spindle 2 is at the zero position of the X axis and at the Z1* position of the calibration plane EK. The tool spindle 2 then advances the calibration mandrel 36 in the X direction until the calibration diameter ØD intersects the laser beam 12 and, according to the description above, generates a 0 signal 27 which marks the X position X1*.0 in the CNC controller 8 and consequently defines the xm distance of the laser beam from the workpiece axis C. The tilt setting angle δ in the plane X-Z can be determined using an analogous calibration operation at level Z2*.

After each calibration operation, calibrated distances ym and xm and the relevant angular positions δ and ε for the measuring position Mp can consequently be filed in the CMC controller 8 and used for further measurements.

The description of said calibration operation also shows, however, that a preferred measurement of the hob peeling tool 1 in the calibration plane EK is largely independent of angular errors and consequently is also able to be used in an advantageous manner with a precisely cylindrical laser beam 12.

FIG. 15 illustrates an optional post process measurement on the peeled workpiece 3 by means of a scanning sensing device 10 which can be arranged in a preferred manner on the tool spindle 2. Said measurement is effected, for example, in at least three tooth gaps according to conventional base circle measurement. Further corrections of the settings for workpiece machining are carried out where required by way of the measurement results. Optimum quality assurance can be achieved in this way.

The tool is shown in a highly schematized manner in all the present drawings. In addition, the cutting surfaces of all cutting teeth are located in a common plane in the case of the tool in the above drawings. The above observations, however, are not limited to the tool shown but can be used for any desired hob peeling tools, even such with step cuts or other geometric designs, or other gear-shaped tools.

All in all, the method proposed here enables the following advantages:

- contactless, quick and highly precise in-process measurement by means of laser bridge 11 at the start and during machining of a workpiece, all measured values being stored in the controller.
- By continuously comparing the current measured values with the start values, dimensional modifications to the cutting edge can be detected, for example wear V (see FIG. 6b).
- Direct detection of the three-dimensional, rounded cutting edge S with compensating curve 17, which generates and consequently also defines the final tooth flank on the peeled workpiece 3 during hob peeling by means of its enveloping cuts.
- When machining a series of workpieces, the time-consuming search for the suitable settings for the CNC axes of the hob peeling machine can be clearly reduced by a precise measurement of the acting cutting edges, process-related rejection being largely avoided.

In summary, the method proposed here comprises the following characteristics:

- A cylindrical sensing surface, which abuts tangentially against the rounded cutting edge, can be used for measurement.
- The cylindrical sensing surface is arranged in such a manner that it lies in the associated tangential plane on the curved tooth flank of the workpiece at the respective contact point and, in this case, is preferably aligned in the direction of the corresponding helix angle.
- A precisely circular, cylindrical, highly precise laser beam is preferably used as cylindrical sensing surface. A tactile measurement sensing device with a cylindrical sensing insert can also be used as an example for other embodiments of the invention. Disadvantages in this connection, however, are the long measuring times, the tactile scanning and the complex signal processing.
- The measuring laser beam lies, therefore, in the tangential plane of a corresponding contact point on the curved tooth flank of the workpiece and would have to be pivoted at other contact points into the associated helix angle during measuring. Said pointwise helix angle on a tooth flank increases in size as the height of the tooth increases. The orientation of the laser beam and consequently also the setting of a corresponding measuring device is determined by said helix angle and the tool setting angle, wherein an adjustable angular region of approximately between 0 and 90° would have to be necessary in total for the laser beam.
- In practice, it would be rather disadvantageous, however, with regard to the costs if the measuring device with the laser beam were to have to carry out said movements. The laser beam can consequently be arranged in an advantageous manner essentially fixedly and vertically in the working space of the hob peeling machine, and the setting of the alignment between laser beam and tool axis is realized instead by the existing CNC pivoting device of the tool spindle. The linear feeds can correspondingly also be realized by the existing CNC axes X, Y and Z. The machine settings are to be calculated for this purpose corresponding to the measuring position. In addition, it is advantageous to arrange the essentially fixed measuring position at a spacing from the workpiece position so that there is sufficient collision-free space present for positioning the tool spindle with the tool.
- By means of a fixedly arranged laser beam, it is then possible to scan multiple, preferably at least five, radial measuring tracks at a defined rotational speed in the region of the tooth-shaped, rounded cutting edges on the rotating hob peeling tool, each measuring track being run at fixedly set values of the tool setting angle. The respective calculated contact point per flank is positioned in the measuring position relative to the laser beam by linear and rotational feeds in the axes X, Y, Z, A and B. A reliable and simple L/0 signal can be generated in a very easy manner with the laser beam by means of the alternating interruption when rotating the tooth-shaped tool. Once one cutting edge side has been measured, the other cutting edge side can be measured in an analogous manner but with modified settings.
- If a cutting tooth on the tool is moved past the laser beam on a measuring track, it can then detect the contact point simply by means of L/0 signals, and the corresponding angular value of the rotating CNC tool spindle can be detected. Said angular values and the settings for the radial measuring tracks can be stored in tabular form in the CNC controller and then used for various gear-typical measurements.

The method proposed here has been explained above by way of examples where a cylindrical sensing surface (e.g. in the form of a laser beam) scans the cutting edge in a tangential manner. In this case, an important aspect was that in each case a virtual contact point on a virtual cutting edge is calculated and the measurement is realized in an orientation and translational position between cutting edge and measuring device which depends on the position of the virtual contact point on the cutting edge. At least part of the above-named advantages, in this case, can also be achieved by using a sensing surface which is not cylindrical in form. For example, it is conceivable to use a laser beam which is focused on the contact point. It is also conceivable to use a non-cylindrical, physical sensing means, for example, in the form of a ball.

At least part of the named advantages can also be achieved additionally not by tangential scanning being carried out but the cutting edge being measured in another manner, for example by distance measurements by means of triangulation methods or a 3D scan measurement. The method presented above is not limited in this regard to tangential scanning by means of cylindrical sensing surfaces.

LIST OF REFERENCE SIGNS

1 Hob peeling tool
1v Virtual hob peeling tool
2 Tool spindle
3 Workpiece, gear
3v Virtual workpiece
4 Workpiece spindle
5 Feed carriage
6 Machine bed
7 Meshing probe
8 CNC controller
9 Control panel
10 Scanning sensing device
11 Laser bridge
12 Laser beam 13 Surface curves
14 Cutting tooth
15 Cutting tooth center
16 Edge at transition cutting edge radius to clearance surface
17 Compensating curve
18 Cutting surface
19 Cutting surface chamfer
20 Working space of a hob peeling machine
21 Scanned measuring curve, measured values
22 Hob peeling machine, gear manufacturing machine
23 Tactile sensing device
24 Movement path of a contact point
25 L/0 signal band
26 L signal
27 0 signal
28 Cutting edge, left-hand side
29 Cutting edge, right-hand side
30 Cutting edge at the root
31 Cutting edge at the tip
32 Perpendicular on the cutting edge
33 Workpiece carrier
34 Tool carrier
35 Hob peeling head
36 Calibration mandrel
37 Cutting edge blank
A Pivot axis of the tool spindle
B Tool axis
Bxy Tool reference place in transverse cross section
C Workpiece axis
Ct Tangential plane at the contact point of a tool with a workpiece
Cz Tooth flank on workpiece
C* Pivot axis of the tool carrier
C** Pivot axis of the workpiece carrier
D1 to D6 Regions of detail in the Figures
ØD Calibration diameter on the calibration mandrel
EK Calibration plane at position Z1*
h Height at calibration mandrel
K System of coordinates of the machine with X and Y origin in the workpiece axis C
Mp Measuring position
Mxz Vertical plane through the center of the laser beam in the X direction;
Myz Vertical plane through the center of the laser beam in the Y direction;
Mxy Horizontal center plane of the laser bridge
m1 to m5 Virtual contact points on the cutting edge
nB Rotational speed of the tool spindle
R Concentricity of the hob peeling tool
R1 to R5 Radii of the measuring tracks on the hob peeling tool
r1 to r5 Radii on the cutting edge
S Virtual cutting edge
S1 to S5 Cutting surfaces on the cutting tooth, perpendicular to the cutting surface and at right angles to the compensating curve
T1 to T5 Cylindrical sensing surfaces which abut tangentially against a rounded cutting edge
V Wear on the cutting edge
X Translational CNC axis
X1*.0 X position when calibrating in calibration plane EK
X2*.0 X position when calibrating at Z position Z2*
xm X distance between the laser beam and the workpiece axis
Y Translational CNC axis
Y1*.0 Y position when calibrating in calibration plane EK with 0 signal at the laser bridge
Y1*.L Y position when calibrating in calibration plane EK with L signal at the laser bridge
Y2*.0 Y position when calibrating at Z position Z2* with 0 signal at the laser bridge
Y2*.L Y position when calibrating at Z position Z2* with L signal at the laser bridge
ym Y distance between the laser beam and the workpiece axis
Z Translational CNC axis
Z1* Z position when calibrating in calibration plane EK
Z2* Z position when calibrating; increased
Z1 to Z5 Z height of the contact point on the tool, with reference to the cutting tooth center 15
z1 to z75 Number of teeth of the tool. e.g. z75
βHelix angle in pitch circle (reference circle)
β1 to β5 Helix angle of the workpiece flank at various tooth heights
δ Tilt angle of the laser beam with respect to the rotational axis of the workpiece spindle in the X direction
ε Angular position of the laser beam with respect to the rotational axis of the workpiece spindle in the Y direction
Δ Tolerance range
Σ Tool angle in the axis position for machining
Σ1 to Σ5 Tool angle in the axis position for measuring
τ Pitch angle
Φ1 to Φ5 Angular positions of the CNC tool spindle

The invention claimed is:

1. A method for measuring a tool for a generating machining of toothed workpieces, the tool being rotatable about a tool axis and comprising a plurality of cutting teeth, each of the cutting teeth forming a real cutting edge, and the method being carried out using a measuring device, that the method comprising:
(a) calculating a virtual contact point on a virtual cutting edge of a virtual tool, the virtual cutting edge extending along a cutting edge longitudinal direction and having a rounding transversely to the cutting edge longitudinal direction;
(b) calculating a relative orientation between the tool axis and the measuring device as well as a translational relative position between the tool and the measuring device on the basis of the calculated virtual contact point;
(c) setting the calculated relative orientation between the tool axis and the measuring device and the calculated relative position between the tool and the measuring device; and
(d) carrying out a measurement on the real cutting edge in the set relative orientation and relative position.

2. The method as claimed in claim 1, wherein the steps (a) to (d) are carried out for a plurality of virtual contact points along the virtual cutting edge.

3. The method as claimed in claim 2, wherein a compensating curve that describes the real cutting edge is calculated from measurement results which have been determined for various contact points on the same real cutting edge.

4. The method as claimed in claim 2, wherein at least one of the following parameters is determined from measurement results which have been determined for various contact points on the same real cutting edge:
at least one measure for the deviation of a profile of a flank produced with the real cutting edge from a virtual flank produced with the virtual cutting edge;

at least one measure for a change in the real cutting edge during the generating machining.

5. The method as claimed in claim 1, wherein the measurements are carried out in step (d) for a plurality of cutting teeth, and wherein at least one of the following parameters is determined from the measurements:
concentricity of tool;
cutting tooth center;
tooth gap center.

6. The method as claimed in claim 1, wherein the measuring device is arranged in a spatially fixed manner during the execution of the method and the setting of the relative orientation and of the relative position is effected by modifying the orientation of the tool axis in space and the position of the tool in space.

7. The method as claimed in claim 1, wherein the measuring device provides a sensing means which operates in a contactless or contacting manner, and wherein the relative orientation and the relative position are calculated and set in such a manner that the sensing means contacts the virtual cutting edge at the calculated virtual contact point in a tangential manner.

8. The method as claimed in claim 7, wherein the sensing means is cylindrical in form.

9. The method as claimed in claim 8, wherein the sensing means defines a cylinder axis, a cylinder radius and a cylindrical sensing surface extending at a distance from the cylinder axis, said distance corresponding to the cylinder radius, and wherein the relative orientation and the relative position are calculated and set in such a manner that the cylinder axis extends parallel to a tangential plane on the virtual cutting edge at the virtual contact point, and that the cylinder axis is at a distance from said tangential plane which corresponds to the cylinder radius.

10. The method as claimed in claim 9, wherein the cylinder axis extends along a flank of a virtual workpiece which is in rolling engagement with the virtual tool.

11. The method as claimed in claim 7,
wherein the sensing means is formed by a light beam,
wherein the tool (1) is rotated about the tool axis for carrying out the measurement in step (d), and
wherein the actual angle of rotation at which the light beam is interrupted by the cutting edge is detected during the rotation.

12. The method as claimed in claim 11, wherein a deviation between the detected actual angle of rotation and a desired angle of rotation calculated for the virtual cutting edge is determined.

13. The method as claimed in claim 11, wherein the measurement in step (d) is carried out for multiple or all cutting teeth of the tool by the tool being rotated sufficiently far about the tool axis that multiple or all cutting teeth interrupt the light beam and unblock it again one after another.

14. The method as claimed in claim 7, wherein the sensing means is a cylindrical sensing finger.

15. The method as claimed in claim 7, wherein the measurement in step (d) is effected at a measuring position, and wherein a calibration measurement for the measuring position is carried out prior to and/or during the machining of a workpiece.

16. The method as claimed in claim 1, additionally comprising at least the following steps:
(e) determining at least one setting for a machine controller on account of a result of the measurements; and (f) transmitting the setting to the machine controller, wherein the setting causes a relative position between a workpiece and the tool to be set for the machining of said workpiece.

17. The method as claimed in claim 1, wherein the tool is one of the following tools:
a hob peeling tool; or
a gear shaping tool.

18. The method as claimed in claim 1, wherein the method is carried out whilst the tool is situated on a tool spindle by way of which machining of workpieces also takes place.

19. A device for carrying out a method for measuring a tool for the generating machining of toothed workpieces, the tool comprising a plurality of cutting teeth, each of the cutting teeth forming a real cutting edge, the device comprising:
a tool spindle for driving the tool for a rotation about a tool axis;
a measuring device;
at least one driven pivot axis in order to modify a relative orientation between the tool axis and the measuring device
at least one driven linear axis in order to modify a translational relative position between the tool and the measuring device; and
a controller configured to carry out the following method:
(a) calculating a virtual contact point on a virtual cutting edge of a virtual tool, the virtual cutting edge extending along a cutting edge longitudinal direction and having a rounding transversely to the cutting edge longitudinal direction;
(b) calculating a relative orientation between the tool axis and the measuring device as well as a translational relative position between the tool and the measuring device on the basis of the calculated virtual contact point;
(c) setting the calculated relative orientation and relative position by means of the pivot axis and the at least one linear axis;
(d) carrying out a measurement on the real cutting edge in the set relative orientation and relative position.

20. The device as claimed in claim 19, wherein the controller carries out the above steps (a) to (d) for a plurality of virtual contact points at various positions along the virtual cutting edge.

21. The device as claimed in claim 19,
wherein the measuring device is arranged in a stationary manner during the measurement,
wherein the pivot axis is configured to modify the orientation of the tool axis in space relative to the fixed measuring device, and
wherein the at least one linear axis is configured to modify the translational position of the tool in space relative to the measuring device.

22. The device as claimed in claim 19,
wherein the device comprises a machine bed and a carrier, which is movable, in particular pivotable, in relation to the machine bed, the carrier being movable between multiple positions in relation to the machine bed,
wherein the measuring device is arranged on the movable carrier, and
wherein the measuring device is movable from a park position into a measuring position by means of the movable carrier.

23. The device as claimed in claim 22, wherein at least one workpiece spindle for clamping a workpiece to be machined is additionally arranged on the movable carrier.

24. The device as claimed in claim 19, wherein the measuring device provides a sensing means which operates in a contactless or contacting manner, and wherein the controller calculates and sets the relative orientation and the relative coordinates in such a manner that the sensing means contacts the virtual cutting edge tangentially at the calculated virtual contact point.

25. The device as claimed in claim 24, wherein the sensing means is cylindrical in form.

26. The device as claimed in claim 24,
   wherein the measuring device comprises a light source and a light detector, wherein the light source is configured to generate a light beam which is directed at the light detector, and wherein the sensing means is formed by at least one region of the light beam,
   wherein the controller interacts with the tool spindle in such a manner that the tool spindle rotates the tool about the tool axis to carry out the measurement in the set relative orientation of the tool axis and with the set relative coordinates, and
   wherein the light detector is configured to detect the actual rotational angle at which the light beam is interrupted by the cutting edge during the rotation.

27. The device as claimed in claim 24, wherein the sensing means is a cylindrical sensing finger.

* * * * *